United States Patent
Wei et al.

(10) Patent No.: US 11,425,578 B2
(45) Date of Patent: Aug. 23, 2022

(54) BASE STATION, VIRTUAL CELL, USER EQUIPMENT

(71) Applicant: Sony Corporation, Tokyo (JP)

(72) Inventors: Yuxin Wei, Basingstoke (GB); Hideji Wakabayashi, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 69 days.

(21) Appl. No.: 17/004,008

(22) Filed: Aug. 27, 2020

(65) Prior Publication Data
US 2020/0396620 A1    Dec. 17, 2020

Related U.S. Application Data

(63) Continuation of application No. 16/091,538, filed as application No. PCT/EP2017/057625 on Mar. 30, 2017, now Pat. No. 10,798,590.

(30) Foreign Application Priority Data

Apr. 6, 2016 (EP) ..................................... 16164131

(51) Int. Cl.
*H04W 16/32* (2009.01)
*H04W 48/18* (2009.01)
(Continued)

(52) U.S. Cl.
CPC ........... *H04W 16/32* (2013.01); *H04W 48/00* (2013.01); *H04W 48/08* (2013.01); *H04W 48/18* (2013.01);
(Continued)

(58) Field of Classification Search
CPC ................ H04L 5/0051; H04W 16/32; H04W 36/0061; H04W 36/0066; H04W 48/00;
(Continued)

(56) References Cited

U.S. PATENT DOCUMENTS

| | | | | |
|---|---|---|---|---|
| 2008/0214249 A1* | 9/2008 | Kim | ...................... | H04W 76/28 455/574 |
| 2009/0185543 A1* | 7/2009 | Chen | ...................... | H04W 48/08 370/338 |

(Continued)

FOREIGN PATENT DOCUMENTS

| | | |
|---|---|---|
| EP | 2375805 A1 | 10/2011 |
| EP | 2 509 345 A1 | 10/2012 |

(Continued)

OTHER PUBLICATIONS

European Communication dated Jun. 4, 2020 in European Application No. 17 713 691.8.
(Continued)

*Primary Examiner* — Kan Yuen
(74) *Attorney, Agent, or Firm* — Xsensus LLP

(57) ABSTRACT

A mobile telecommunications system anchor base station for a mobile telecommunications system is provided. The mobile telecommunications system has at least one anchor cell and at least one slave cell which is associated with the anchor cell. The anchor base station has circuitry which is configured to broadcast slave cell system information being specific for the at least one slave cell.

19 Claims, 8 Drawing Sheets

(51) Int. Cl.
*H04W 48/00* (2009.01)
*H04W 48/08* (2009.01)
*H04W 68/02* (2009.01)
*H04W 72/04* (2009.01)
*H04W 72/12* (2009.01)

(52) U.S. Cl.
CPC ....... *H04W 68/02* (2013.01); *H04W 72/0406* (2013.01); *H04W 72/12* (2013.01)

(58) Field of Classification Search
CPC ..... H04W 48/08; H04W 48/10; H04W 48/18; H04W 68/02; H04W 72/0406; H04W 72/12
See application file for complete search history.

(56) References Cited

U.S. PATENT DOCUMENTS

| | | | |
|---|---|---|---|
| 2009/0274086 A1* | 11/2009 | Petrovic | H04W 48/10 370/312 |
| 2013/0163508 A1 | 6/2013 | Yu | |
| 2013/0182685 A1* | 7/2013 | Yu | H04W 72/087 370/336 |
| 2013/0229931 A1 | 9/2013 | Kim | |
| 2015/0326371 A1 | 11/2015 | Baek et al. | |
| 2015/0358945 A1 | 12/2015 | Susitaival et al. | |
| 2015/0358957 A1 | 12/2015 | Kim et al. | |
| 2015/0365993 A1 | 12/2015 | Aminaka et al. | |
| 2015/0373584 A1* | 12/2015 | Hong | H04W 28/08 370/329 |
| 2015/0382260 A1* | 12/2015 | Van Phan | H04W 16/32 455/436 |
| 2016/0043879 A1* | 2/2016 | Chandwani | H04L 12/189 370/312 |
| 2016/0066357 A1 | 3/2016 | Goldamer | |
| 2016/0234759 A1* | 8/2016 | Kubota | H04W 48/12 |
| 2017/0215078 A1* | 7/2017 | Mochizuki | H04W 4/06 |
| 2017/0238301 A1 | 8/2017 | Nakazawa et al. | |
| 2017/0265165 A1* | 9/2017 | Li | H04W 48/14 |
| 2018/0019857 A1* | 1/2018 | Kazmi | H04L 5/14 |
| 2018/0376531 A1 | 12/2018 | Martinez et al. | |
| 2020/0304940 A1* | 9/2020 | Thangarasa | H04W 48/12 |

FOREIGN PATENT DOCUMENTS

| | | |
|---|---|---|
| WO | WO-2014087556 A1 | 6/2014 |
| WO | 2016/020752 A2 | 2/2016 |

OTHER PUBLICATIONS

MONEY: System informaton Blocks (SIB). Dec. 7, 2014. URL: http://thetelecom4u. blog spot.com/2014/07 /system-information-blocks-sib. html [abgen,ifen am Jan. 2, 2019], 4 pages.

Kousik Nandi: System information in LTE. Dec. 11, 2015. URL: https://lteqa.blogspot.com/search/label/SIB 18 [abgerufen am May 2, 2019], 6 pages.

German Office Action dated Feb. 5, 2019, issued in German Application No. 11 2017 000 018.1, 6 pages.

"3rd Generation Partnership Project; Technical Specification Group Services and System Aspects; Study on architecture enhancements for Cellular Internet of Things (Release 13)," 3GPP TR 23.720, V13.0.0, pp. 1-94 (Mar. 2016).

"Prioritization of functions to support dual connectivity," Huawei, 3GPP TSG-RAN WG3 Meeting #83, pp. 1-3 (Feb. 10-14, 2014).

"System information in dual connectivity," Ericsson, 3GPP TSG-RAN WG2 #85bis, pp. 1-2 (Mar. 31, 2014-Apr. 4, 2014).

"System information provisioning for SCG," Intel Corporation, 3GPP TSG RAN WG2 Meeting #86, Release 14, pp. 1-3 (May 19-23, 2014).

International Search Report and Written Opinion for International Application No. PCT/EP2017/057625, dated Jul. 6, 2017.

* cited by examiner

BASE STATION, VIRTUAL CELL, USER EQUIPMENT

CROSS-REFERENCE TO RELATED APPLICATIONS

The present application is a continuation of U.S. application Ser. No. 16/091,538, filed Oct. 5, 2018, which is based on PCT filing PCT/EP2017/057625, filed Mar. 30, 2017, which claims priority to EP 16164131.1, filed Apr. 6, 2016, the entire contents of each are incorporated herein by reference.

TECHNICAL FIELD

The present disclosure generally pertains to a base station, a virtual cell and a user equipment for a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

The candidate for providing the requirements of 5G is the so called Long Term Evolution ("LTE"), which is a wireless communication technology allowing high-speed data communications for mobile phones and data terminals and which is already used for 4G mobile telecommunications systems.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation "3G") network technologies.

LTE is standardized under the control of 3GPP ("3rd Generation Partnership Project") and there exists a successor LTE-A (LTE Advanced) allowing higher data rates as the basis LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with features and methods which are already defined in the LTE and LTE-A standard documentation.

5G technologies will allow a concept of a so called "virtual cell" or "local cell" or the like. In this concept a cell is served by a user equipment ("UE"), e.g. a mobile phone, a computer, tablet, tablet personal computer or the like including a mobile communication interface, or any other device which is able to perform a mobile telecommunication via, for example, LTE(-A), such as a hot spot device with a mobile communication interface. In short the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it backhauls to network preferably in licensed bands.

A logical separation between control plane and user plane has been done in accordance with introduction of the IP Multimedia System (IMS) for LTE, and a physical separation between control plane and user plane has been proposed as a possible solution for 5G. Since requirements for the control plane should be basically robustness and wide coverage so as to maintain the service continuity, a macro or anchor base station should provide a link of the control plane. On the other hand a key performance of the user plane is the efficient spectrum usage in order to improve the cell capacity. However, since the requirements of the user plane are highly depending on specific use case or UE capability/category, a variety of types of reception/transmission or routing methods are considered according to the respective use case or UE capability/category taking into account a concept for 5G such as "network slicing".

For the 5G technologies, it is envisaged that a UE in the function as virtual cell should be able to take over responsibilities, which are typically done, for example, in a base station, or eNodeB (Evolved Node B) as it is called in LTE (the eNodeB is the element in the evolved UTRA of LTE, the UTRA being the UMTS Terrestrial Radio Access). Such responsibilities which are envisaged to be performed in the UE as a virtual cell, are, for example, radio resource management, radio resource control ("RRC") connection control, etc. Hence, it is not solely relied on the eNodeB or a small cell to relay data and to organize the local network, but such functions are shifted to the UE function as a virtual cell. The existence of such intermediate nodes of virtual cells in the network are expected to offload signalling overhead from the eNodeB, to allocate radio resource efficiently, etc. However, for such requirements of future 5G technologies the signaling features and methods as being defined so far for LTE(-A) might be not optimal and, thus, it is generally desirable to improve known signaling and messaging methods.

SUMMARY

According to a first aspect, the disclosure provides a mobile telecommunications system anchor base station for a mobile telecommunications system including at least one anchor cell and at least one slave cell being associated with the anchor cell, the anchor base station comprising circuitry being configured to broadcast slave cell system information being specific for the at least one slave cell.

According to a second aspect, the disclosure provides a mobile telecommunications system slave base station for a mobile telecommunications system including at least one anchor cell and at least one slave cell being associated with the anchor cell, the slave base station comprising circuitry being configured to broadcast slave cell specific system information being specific for the at least one slave cell.

According to a third aspect, the disclosure provides a slave cell being established by a slave base station and being connected to an anchor base station in a mobile telecommunications system, the mobile telecommunications system comprising the anchor base station, the anchor base station being configured to communicate with at least one user equipment and at least one further slave cell, the at least one further slave cell being configured to communication with at least one user equipment and the anchor base station, the slave cell comprising circuitry being configured to broadcast slave cell specific system information being specific for the at least one slave cell.

According to a fourth aspect, the disclosure provides a user equipment being connectable to at least one anchor cell and at least one slave cell of a mobile telecommunications system, the mobile telecommunications system comprising the anchor cell being configured to communicate with at least one user equipment and at least one slave cell, the at least one slave cell being established by a slave base station and being configured to communication with at least user equipment and the anchor base station, the user equipment comprising a circuitry being configured to receive system information from different physical cell sites.

According to a fifth aspect, the disclosure provides a base station for a mobile telecommunications system, the base station comprising a circuitry being configured to communicate with at least one user equipment of the mobile telecommunications system and at least one virtual cell of the mobile telecommunications system, the circuitry being further configured to record a mapping information of a mapping between a user equipment and a evolved packet core entity of the mobile telecommunications system.

According to a sixth aspect, the disclosure provides a virtual cell being connectable to a base station of a mobile telecommunications system, the base station being configured to communicate with at least one user equipment and at least one virtual cell, the virtual cell comprising circuitry being configured to communicate with at least one user equipment and the base station, the circuitry being further configured to record a mapping information of a mapping between a user equipment and a evolved packet core entity of the mobile telecommunications system.

According to a seventh aspect, the disclosure provides a user equipment being connectable to a base station and a virtual cell of a mobile telecommunications system, the base station being configured to communicate with at least one user equipment and at least one virtual cell, the virtual cell being configured to communication with at least one user equipment and the base station, the user equipment comprising a circuitry being configured to transmit a user equipment virtual cell connection mode on the basis of data characteristics of data to be transmitted.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
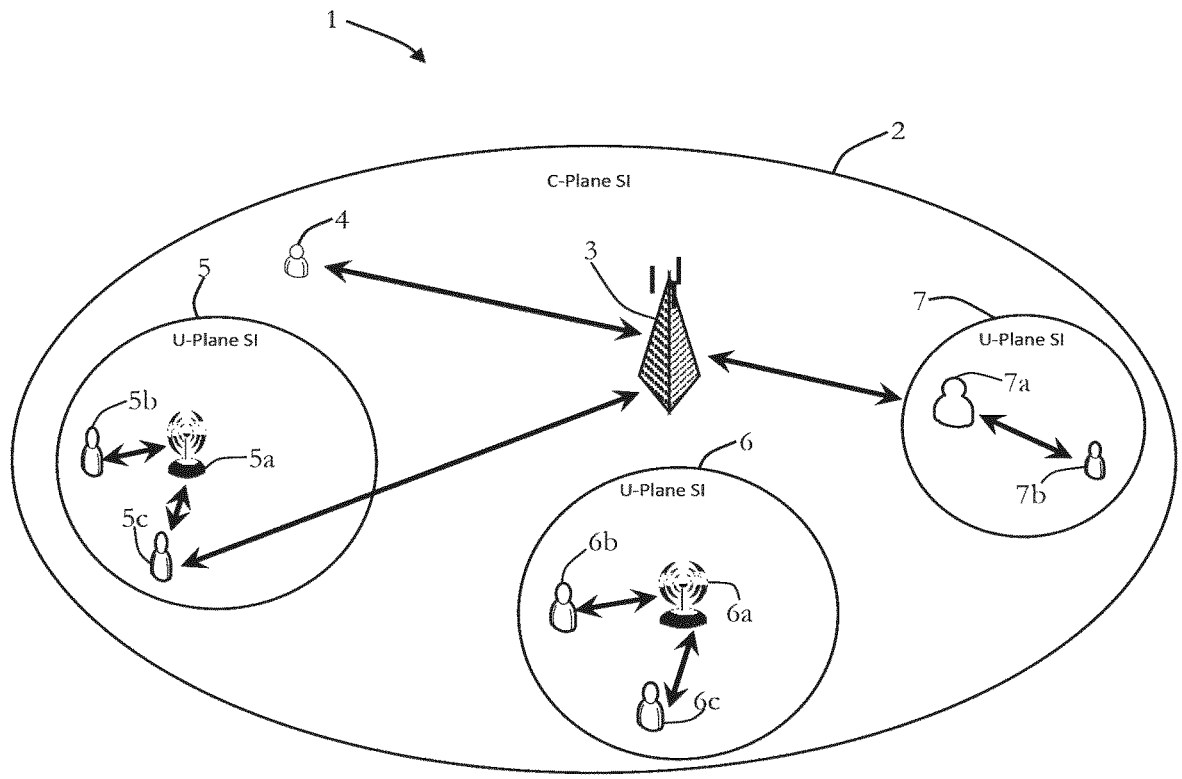
FIG. 1 illustrates a radio access network with a control plane cell, user plane cells and a virtual cell.

Before a detailed description of the embodiments under reference of FIG. 1, general explanations are made.

The following description is divided into two parts. The first part pertains to layered system information and the second part pertains to connection-oriented and connection-less communication for a virtual cell. However, the skilled person will appreciate that the embodiments of the two parts can also be combined with each other.

The following description will exemplary refer to LTE (Long Term Evolution) technology, in order to explain the embodiments of the present disclosure. However, the skilled person will appreciate that the present disclosure is not limited to LTE. Moreover, although the present description generally refers to "LTE", the skilled person will appreciate that "LTE" shall cover also more advanced versions of LTE, such as LTE-A (LTE advance), LTE-B, which is not yet standardized, but under development, etc. All those versions are referred to as "LTE" in the following.

As mentioned in the outset, 5G technologies will allow a concept of a so called "virtual cell" or "local cell" or the like. In this concept a cell is served by a user equipment ("UE"), e.g. a mobile phone, a computer, tablet, tablet personal computer or the like including a mobile communication interface, or any other device which is able to perform a mobile telecommunication via, for example, LTE(-A), such as a hot spot device with a mobile communication interface. In short the UE works dynamically as an intermediate node for establishing an indirect network connection between other UEs in the vicinity of the virtual cell or local cell and the network, and/or as an intermediate node between UEs. A function of the intermediate node on the UE may also be carried out by "virtualization". A virtual cell or local cell may communicate with UEs in unlicensed, shared licensed or licensed bands, and it backhauls to network preferably in licensed bands.

First Part—Layered System Information

The first part pertains to the idea of layered system information.

System information is a type of control information. In the current LTE, the system information is broadcasted in so called System Information Blocks (SIB), which are, for example:

MIB (Master Information Block): physical layer information of a LTE cell, e.g. transmission bandwidth configuration, system frame number etc.

SIB1: information regarding whether or not UE is allowed to access the LTE cell, defines scheduling of the other SIBs, and carries cell ID, SIB mapping information, etc.

SIB2: common channel and shared channel information

There exist further blocks, e.g. SIB4 to SIB19 in LTE, which are generally known.

In the current LTE standard, e.g. Release 13, the system information transmission and reception has exemplary the following properties:

At first, for each cell the full system information is provided. The target of the current LTE system information design is to provide the system information to all UEs in the coverage of a cell, such that it contains all the relevant system information for operation without having to consider the differences between cells or UEs. From the eNodeB's, i.e. base station's, point of view this means that resources are occupied, since the complete set of system information has to be sent. From the UE's point of view, it would be possible, for example, to only read the SIB1 scheduling information, mentioned above, to receive related system information which would avoid to read the whole set of system information.

For the future 5G architecture, as mentioned above, a cell, and in particular a virtual cell, may have different roles in the network. For instance, it is envisaged to provide a control plane cell and user plane cell. This separation into control plane cell and user plane cell may be made in a way, for example, that user data are handled by the user plane cell and signalling is handled by the control plane cell. As discussed, for 5G, the control plane cell or the user plane cell could be a UE cell, i.e. a virtual cell, or a traditional cell. Moreover, the control plane cell or the user plane cell could be a standalone 5G cell or traditional LTE cell dual connected with the 5G cell. Hence, in 5G, for each cell, there will be multiple different functionalities and roles to be realized such that providing the full system information in each cell might cause a waste of resources. The control plane cell may be established by a normal base station, e.g. eNodeB, while the user plane cell may also be established by a UE.

At second, in current LTE, the system information is based on an "always on" transmission, which means that the system information is scheduled block wise, i.e. for each SIB an own schedule is provided. For instance, the Master Information Block ("MIB"), which includes information about the system bandwidth, PHICH ("Physical Hybrid ARQ Indicator Channel"), system frame number, etc., is scheduled with a periodicity of 40 ms and repeated within 40 ms, while the SIB1 is scheduled with a periodicity of 80 ms and repeated within 80 ms. The scheduling information of all other SIBs is indicated in the SIB1. The short period of the transmission of the MIBs and SIBs occupies respective radio resources for both the eNodeB and the UE for -transmission/-receipt of the MIBs/SIBs-. Moreover, even if no user is present in a cell, the system information will be transmitted. For the 5G system, it is envisaged that services are provided on an UE centric basis and that cells, including a UE cell, i.e. a virtual cell, may be triggered on demand. Hence, the design principle of the always on system information is re-considered in some embodiments and control signalling and catering for UE centric services may be optimized.

At third, the system information change notification procedure may be improved. Before the LTE Rel-13, a so-called SystemInfoValueTag, which is used to indicate that a change has occurred, does not have any indication which one of the system information blocks has been changed. Hence, all UEs have to receive all system information blocks. In the LTE Rel-13 3GPP documents for Machine-Type Communications ("MTC"), an indication of a value tag is introduced for each system information block. On the basis of this indication of the value tag, it would be possible that the UE only receives the changed system information block instead of having to receive all system information blocks. Furthermore, if the changed SIB does not pertain a specific UE, the specific UE does not have to receive the changed SIB. However, this approach might not be sufficient for the envisaged 5G system, since the UEs may differ according to their subscribed services such that a change on certain system information blocks may have different impacts on different UEs having subscribed different services. Thus, in some embodiments, the system information block partition as well as its change notification is designed in order to address the above discussed issues.

In summary, in some embodiments, the following challenges are addressed in the design of system information transmission and reception.
(1) Differentiated system information to cater for the different functionality and role of each cell including the UE cell.
(2) Service or UE triggered system information transmission in order to reduce the control signalling, instead of always on transmission.
(3) System information reception improvement in order to adapt to different UE and service demands.

In order to reduce the signalling overhead of system information transmission and distinguish the system information transmission on different nodes, the layered system information architecture is proposed. In the architecture, different nodes, such as macro cell nodes, pico cell nodes, small cell nodes, etc., will transmit necessary while differentiated system information separately, according to e.g. control plane and user plane separation, cell slices and working modes. A slice or cell slice or network slice is a logical concept in 5G according to which different demands and/or functionalities are logically included in a respective slice. For example, some services require a high speed data transmission and allow a high latency, such services can be bundled in a "high speed slice", while other services, e.g. remote operation of heavy-duty machinery, may need a low latency, but high bandwidth, may cover a limited geographical area and may support a known maximum number and type of devices, such that this can be bundled in a respective "machine type communication slice" or the like. Furthermore, in each layer, the system information may be further divided into static and semi-static system information as well as UE (group) specific system information. Such static and semi-static system information may then be transmitted in different modes.

Consequently, some embodiments pertain to a mobile telecommunications system anchor base station for a mobile telecommunications system. The mobile telecommunications system may be based on the principles of the LTE technology. The mobile telecommunications system includes at least one anchor cell, being established e.g. by the anchor base station, and at least one slave cell being associated with the anchor cell and being established, for example, by a slave base station. As mentioned herein, the anchor cell may be a control plane cell or a macro cell or the like. The slave cell may be a user plane cell or a small cell or the like. Moreover, the user plane cell may also be a virtual cell, as discussed herein.

The anchor base station can be based on the known eNodeB of LTE, as one example. The anchor base station comprises circuitry being configured to broadcast slave cell system information being specific for the at least one slave cell. The circuitry may be configured to communicate with at least one user equipment, at least one slave cell base station and/or with at least one slave cell, and/or at least one virtual cell, as described herein. As mentioned, the user equipment may be, for example, a mobile phone, smartphone, a computer, tablet, tablet personal computer or the like including a mobile communication interface, or any other device which is able to perform a mobile telecommunication via, for example, LTE, such as a hot spot device with a mobile communication interface, etc.

Although herein and in the following features are described which are to be performed by a circuitry, the same features can be part of a method, which can be performed, for example, by a circuitry, such as the circuitry of the anchor base station, the circuitry of a slave base station (see description further below), the circuitry of a virtual cell (see further below), and/or the circuitry of a user equipment (see further below).

The circuitry (method to be performed) of the anchor base station may be configured to broadcast anchor cell system information being specific for the at least one anchor cell. The communication in the mobile telecommunications system may be distributed at least over a control plane and a user plane, as described herein, wherein, for example, signaling is communicated over the control plane and user data are communicated over the user plane. The system information which is specific for the anchor cell and/or the slave cell may be broadcasted over the control plane and the user plane. As discussed, the at least one anchor cell may be a control plane cell and the at least one slave cell may be a user plane cell. The control plane specific system information may be broadcasted. Slave cell system information including user plane specific information. The slave cell system information may include scheduling information indicating a broadcast schedule for the user plane. The user plane specific information may include the scheduling information. The slave cell system information may include information indicating services supported by the user plane. The user plane specific information may include the information indication services supported by the user plane. The slave cell system information may be broadcasted with different periodicity. The system information may be divided into static system information and semi-static system information. The static system information may be broadcasted with a first periodicity and the semi-static system information may be broadcasted with a second periodicity, the first and second periodicity being different. The static system information may include at least one of cell specific configuration data which are unchangeable and cell specific candidate configuration data. The semi-static system information may include cell specific configuration data which are changeable. The semi-static system information may include adopted cell specific configuration data according to the candidate configuration data included in the static system information. The slave cell system information may be broadcasted in response to a received request issued by a user equipment. The slave cell system information which is specific for the user equipment may be broadcasted. The user specific slave cell system information may be broadcasted on the basis of at least one of groupcast transmission or radio resource control signaling. A demand of the user equipment may be predicted on the basis of historical data, which has been collected, for example, in the past.

Some embodiments pertain to a mobile telecommunications system slave base station for a mobile telecommunications system including at least one anchor cell and at least one slave cell being associated with the anchor cell, as discussed above. The slave base station may be a user equipment, as discussed herein. The slave base station comprises circuitry being configured to broadcast slave cell specific system information being specific for the at least one slave cell. The slave base station may be configured to perform the features as discussed above in connection with the anchor base station. The slave base station may be configured to communicate with at least one anchor base station, at least one further slave base station, at least one user equipment, at least one slave cell, and/or with at least one virtual cell.

Some embodiments pertain to a slave cell being established by a slave base station, as discussed herein, and being connected to an anchor base station in a mobile telecommunications system, the mobile telecommunications system comprising the anchor base station, the anchor base station being configured to communicate with at least one user equipment and at least one further slave cell, the at least one further slave cell being configured to communication with at least one user equipment and the anchor base station, the slave cell comprising circuitry being configured to broadcast slave cell specific system information being specific for the at least one slave cell. The slave cell may be a virtual cell. Moreover, the slave cell may be configured to perform all the features as described herein for the anchor base station and/or the slave base station. The slave cell may be configured to communicate with at least one further slave cell. Moreover, the circuitry of the slave cell may be configured to broadcast user plane specific system information including slice information, numerology (Orthogonal Frequency-Division Multiplexing (OFDM) symbol times, CP length, FFT size, sample rates and the like) and waveform configuration data. The user plane specific system information may include timer configuration data indication when and/or how long a virtual cell is turned on, band information, mobile status information, and/or resource pool configuration data.

Some embodiment pertain to a user equipment, as described herein, being connectable to at least one anchor cell and at least one slave cell of a mobile telecommunications system. The mobile telecommunications system includes the anchor cell being configured to communicate with at least one user equipment and at least one slave cell, the at least one slave cell being established by a slave base station and being configured to communication with at least user equipment and the anchor base station, the user equipment includes a circuitry being configured to receive system information from different physical cell sites. The different physical cell sites may include at least one anchor cell and at least one slave cell, as described herein. The circuitry may be further configured to receive system information including information indicating at least one service provided by the at least one slave cell. The circuitry may be further configured to read the service related information from the system information and to determine whether to access the slave cell based on the service related information. The circuitry may be further configured to receive system information from the anchor cell and slave cell specific system information from the slave cell. The at least one of the system information and the slave cell specific system information may include scheduling information, as discussed above. The circuitry may be further configured to read the scheduling information from the anchor cell and to receive the slave cell specific system information from the slave cell. The circuitry may be further configured to send a request to receive system information on demand, wherein the system information includes user equipment specific system information. The circuitry may be further configured to send the request to the anchor cell or the slave cell. The circuitry may be further configured to receive system information which is divided into static system information and semi-static system information. The circuitry may be further configured to send user equipment specific preference data to the anchor cell and/or to the slave cell for preconfiguration.

Returning back to FIG. 1, there is illustrated a separation into a user plane and control plane in a RAN (Radio Access Network) 1.

In LTE, all cells, such as—Primary Cells (PCell) and Primary Secondary Cells (PSCell) will transmit the same set of system information blocks. In other words, in current LTE there is no differentiation between different cells.

For the layered system information architecture presented herein, as discussed above, the general idea is that different cells may transmit different sorts of system information in accordance with its role in the network 1.

For example, the role of a cell includes its functionality in the whole network (e.g. control plane or user plane, UE cell, i.e. virtual cell), its provided services (e.g. high data volume, low latency, mission critical, D2D ("device to device"), its working style (e.g. static, mobile, turn on/off, on demand, always on) etc. As discussed above, the terms control plane cell and user plane cell are used as examples for the more general terms "anchor cell" and "slave cell" introduced above. The division of the RAN into a control plane cell and user plane cells is a candidate architecture of the envisage 5G system.

In the following description of the embodiments under reference of the figures, the term control plane cell is used to indicate at least that the mobility management is conducted by the control plane cell and that there will be no handover between the user plane cells within the same control plane cell.

Such an architecture is shown in FIG. 1. The RAN 1 includes a control plane cell 2, wherein within the control plane cell 2 control plane system information ("C-Plane SI") is transmitted. The control plane cell 2 is established by a base station 3 (also referred to as anchor base station above), which is in the present embodiment basically an eNodeB type base station except for the principles described herein.

Within the coverage of the control plane cell 2, a UE 4 is located as well as user plane cells 5, 6 and 7, wherein the user plane cell 7 is a virtual cell in the present embodiment.

The user plane cells 5 and 6 are small cells and they are established by base stations 5a and 6a, respectively, which are both implemented as hot spots in the present case (and which can be considered as slave cell base stations in the sense as discussed above). The user plane cell 7 is established by a UE 7a (which can also be considered as a slave base station in the sense above), which is a smartphone, for example, such that a UE 7b in the user plane cell 7 can directly access the user plane 7 over the UE 7a. Such a user plane cell 7, is also referred to as "virtual cell" or "UE virtual cell". In all user plane cells 5, 6 and 7, user plane system information is broadcasted by the respective slave base stations 5a, 6a and 7a establishing the respective user plane cells 5, 6 and 7. Moreover, in each user plane cell 5, 6 and 7, further UEs 5b, 5c, 6b, 5c and 7b are located which communicate with the respective slave base stations 5a, 6a and 7a establishing the respective user plane cells 5, 6 and 7.

The base station 3 communications with UEs in the area of the control plane cell 2 directly, such as UE 4, which is not in a user plane cell, and UE 5c, which is in the user plane cell 5, and the base station 3 communicates with the user plane cell, e.g. user plane cell 7 in FIG. 1. Communication with a user plane cell can mean that the base station 3 communicates with all entities within a user plane cell and/or it can mean that the base station 3 communicates with the UE or base station which establishes the respective user plane cell.

From that separation into a control plane cell and user plane cells, for instance, the following examples can be implemented in some embodiments.

For instance, each cell, i.e. each control plane cell 2 and each user plane cell 5, 6, and 7 broadcasts its own cell specific system information, but the broadcasted system information does not need to be the same among different cells.

For example, as the control plane cell will take the charge of the overall control plane functionality, in control plane system information, it should include the control information of its whole coverage (user plane related system information) besides its own cell specific access information. Hence, the system information broadcasted by the control plane cell may include the following information either in total or in parts:

1) User plane cell id list in the control plane cell area, which lists all available user plane cells.
2) User plane cell system information scheduling information (if any), which indicates scheduling of the user plane cell system information.
3) User plane reference signal scheduling information (if any).
4) Slice id of a respective slice and control plane cell and user plane cell association (if any), as well as supported slices (services) of each user plane cell.
5) Control plane cell control channel configuration.
6) Skip System Information Indication bit, used to indicate whether the UE could skip the reading of system information of the user plane cell. This indication is provided from control plane cell point of view for the case when certain user plane cells are turning off. When some user plane cells are in turn off status, the UE could skip reading the system information of turning off cell and to read the corresponding system information transmitted by control plane cell instead.

In some embodiments, in particular for the control plane cell, it is useful to keep the size of the system information small or even as small as possible. Hence, in some embodiments, only the necessary access information (including service access information) as well as its linkage with the user plane cells is included. As discussed above, the system information of the control plane cell 2 may be broadcasted by the base station 3 establishing the control plane cell 2.

For the user plane cell, e.g. user plane cells 5, 6 and 7, besides the conventional cell specific system information (user plane specific system information) the broadcasted system information may include the following information in total or a part of it:

1) Association with the control plane cell.
2) Data channel configuration.
3) Numerology (with different configurations).
4) User plane cell characteristics (licensed, un-licensed, shared license, mmWave, fixed cell, moving cell, UE cell, etc.)
5) Supported waveforms and their configurations, e.g. FBMC (Filter Bank Multiple Carrier), UFMC (Universal Filtered Multiple Carrier), etc., and their configurations.

In some embodiments, the UEs in the coverage of control plane area of the control plane cell 2, e.g. UEs 4, 5b-c, 6b-c, 7a-b, may need to receive both the control plane system information and the user plane system information.

But, in some embodiments, only the control plane cell 2 broadcasts the system information, for example, including scheduling information about the specific user plane cell system information transmission, i.e. the scheduling information indicates at which points of time the specific user plane cell system information is broadcasted and, thus, can be received. After the UE receives the scheduling information included in the system information, it can switch in a mode where it receives the corresponding (future) user plane cell system information on specific resources of the control plane cell.

Figure 2:
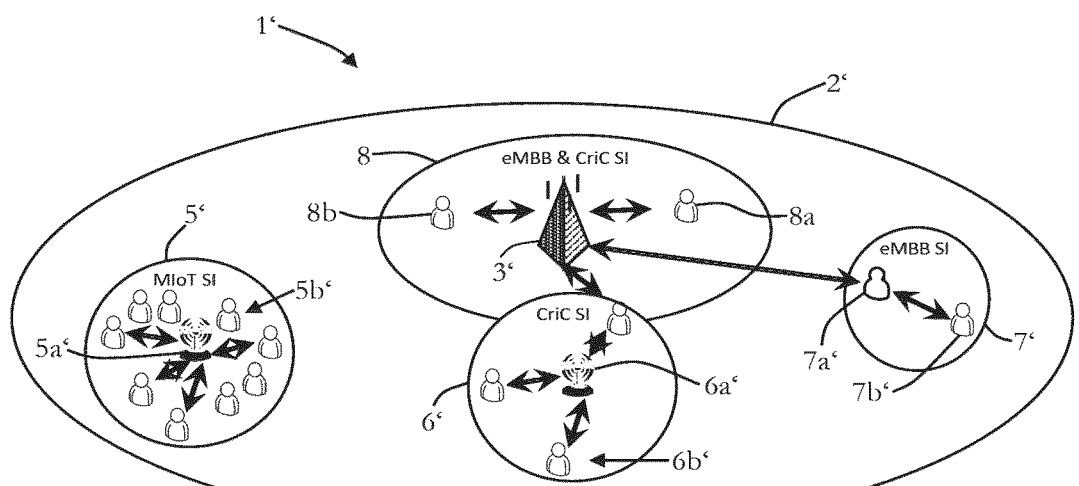
FIG. 2 illustrates a radio access network, similar to the radio access network of FIG. 1, wherein the user plane cells and the virtual cell are in different network slices.

FIG. 2 illustrates an embodiment of a RAN 1', where the technology of different slices is implemented.

In the future 5G system, diverse use cases might be supported, e.g. in the form of (network) slices. As mentioned above, each slice is featured, for example, with a collection of logical network functions that support differentiated service requirements.

RAN 1' is very similar to RAN 1 of FIG. 1 such that the general technical implementation discussed with reference to FIG. 1 also applies here. RAN 1' has a control plane cell 2' which is established by a base station 3', a first user plane cell 5', which is a small cell and is established by a slave base station 5a' (implemented as hot spot), a second user plane cell 6', established by a slave base station 6a' (also a small cell and implemented as hot spot) and a third user plane cell 7', established by a UE 7a' (implemented as smartphone) and which is a virtual cell. In each of the user plane cells 5', 6' and 7' multiple respective UEs 5b', 6b' and 7b' are present.

The user cells are in different slices. For instance, the user plane cell 5' is in a massive Internet of Things (MIoT) slice and broadcasts respective MIoT system information. The user plane cell 6' is in a Critical communication (CriC) slice and broadcasts respective CriC system information. The user plane 7' is in an evolved Mobile Broadband (eMBB) slice and broadcasts respective eMBB system information. Moreover, the base station 3' establishes a user plane cell 8 where two UEs 8a and 8b are present. The user plane cell 8 is in the eMBB and the CriC slice and, thus, broadcasts eMBB and CriC system information.

From each cell's point of view, it may support a single or multiple slices and from each UE's point of view, it may connect to single or multiple slices as well, as shown in FIG. 2.

Hence, in some embodiments, the specific information about the services or slices in provided different cells is included in the system information which is broadcasted by the cells, i.e. the control plane cells and the user plane cells. Such specific information may vary in dependence of the respective slices. The specific information, which is included in the system information broadcasted by the control plane cell and/or user plane cell can include the following (all or in parts):

1) Multiple slices support indication, which informs about whether the respective cell supports multiple slices.
2) Supported slices, slice feature information (service characteristics, QoS parameters and the like.
3) System information scheduling information for different slices.
4) Slice specific control and data channel configuration, slice specific resource allocation (partition) (if any), etc.

In a further embodiment, which is based on the embodiments of FIGS. 1 and 2 above, different cell working modes are provided.

In the 5G system, the cell concept may be extended to a broader range in the sense that the cell can be a UE (UE virtual cell), or a moving cell (bus as an example). The cell could be activated based on the user demand (UE virtual cell), always on (control plane cell) or occasionally turned on/off (e.g. some user plane cells) mode. The cell could be a fixed one (e.g. conventional macro cell) or a mobile one (UE virtual cell or moving cell). The cell could work on the licensed, un-licensed, or shared licensed band. Different working modes will impose different requirements on the composition of system information, as it has also been explained above.

As discussed above, the cell could work in an anchor mode (dual connectivity, carrier aggregation) or a standalone mode. For cells working with an anchor cell, the system information partition between anchor cell and slave cell could be as has been described above for the control plane cell and its specific control plane cell system information and the user plane cell and its specific user plane cell system information.

In this embodiment, it is shown how to differentiate the system information among cells, which are on the same level, for example, control plane cells or user plane cells.

In this embodiment, a UE virtual cell is used as an example. The virtual cell maybe activated on demand, e.g. when the UE sends a respective request to the control plane cell base station (anchor base station), then the system information broadcasted by the UE establishing the UE virtual cell, may include the following information (all or in parts):

1) Provided service type,
2) User subscription info,
3) Timer configuration,
4) Static resource pool configuration,
5) Mobile state,
6) Charging info,
7) Band info e.g. licensed, unlicensed and shared licensed.
8) Radio interface info e.g. LTE, WiFi, Bluetooth etc.
9) Communication traffic related info like busy hour, traffic load, congestion status
10) Coverage related info (e.g. poor coverage which requires the system information for coverage extension)

With such system information configuration, it does not rely on a "giant cell" (anchor cell on which it depends) to transmit all the service related system information, in particular to the UEs which are in the coverage of the UE virtual cell. Hence, the "giant cell" does also not have to send such service related system information in a cell, where no service demands are present. In some embodiment, in the future 5G system, a cell may be deployed based on a respective service. Hence, then, for example, in a mission critical cell it is not necessary to broadcast Multimedia Broadcast Multicard Service (MBMS) or evolved Mobile Broadband (eMBB) related configurations in the system information. In contrast, the respective cell will only transmit, for example, its service/function specific control information in its cell specific system information.

Figure 3:
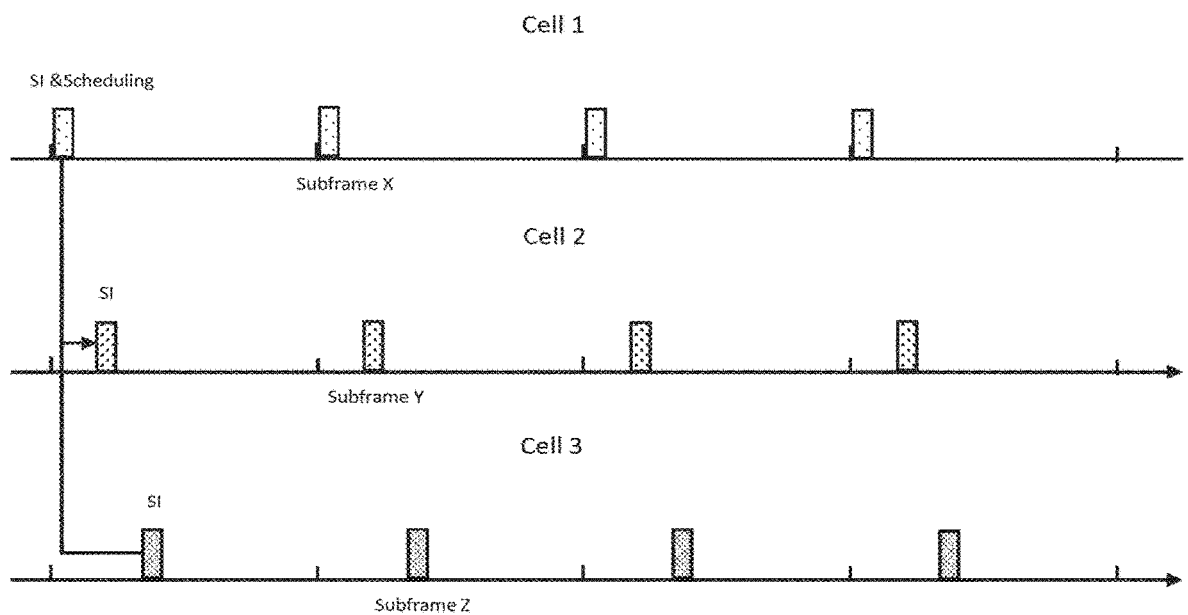
FIG. 3 shows periodicity of system information broadcasted by control plane and user plane cells.
Figure 4:
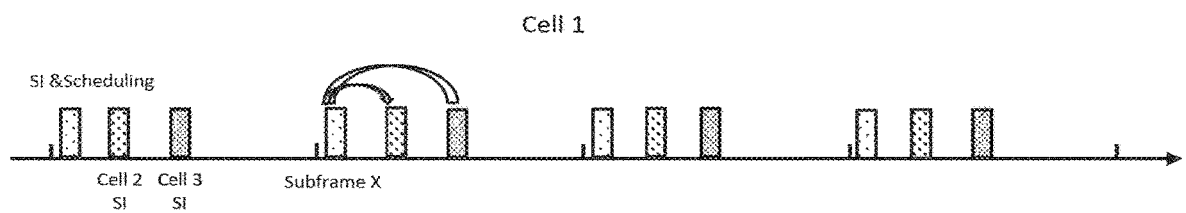
FIG. 4 shows the broadcast of system information of a control plane base station centric approach.

The following embodiment pertains to the transmission of the system information, in particular, of system information which is specific for the user plane cells and the control plane cell and it is explained under reference of FIGS. 3 and 4.

For the present embodiment we assume a separation of the RAN into a control plane and a user plane with a respective control plane cell, referred to as "cell 1" in FIGS. 3 and 4, and two user plane cells, referred to as "cell 2" and "cell 3". The control plane cell "cell 1" may correspond to the control plane cell 2 of FIG. 1 above, the user plane cell "cell 2" may correspond to the user plane cell 5 or 6 of FIG. 1 and the user plane cell "cell 3" may correspond to the user plane cell 7 of FIG. 1, which is exemplary a UE virtual cell.

In the following, two exemplary embodiments are described which show different approaches for the transmission of the layered system information, i.e. control plane cell specific and user plane cell specific system information.

In a first approach, the layered system information is transmitted in a distributed manner, as also shown in FIG. 3.

The control plane cell, as shown in the first section of FIG. 3 ("Cell 1"), indicates respective scheduling information in the system information of its associated user plane cell(s). This system information including scheduling information ("SI "Scheduling") is periodically broadcasted in a subframe X.

Each user plane cell, i.e. "Cell 2" in the middle section of FIG. 3 and "Cell 3" in the lower section of FIG. 2, transmits its user plane cell specific system information by itself. Each user plane cell may have its own scheduling. In the embodiment of FIG. 3, "Cell 2" transmits its system information in the subframe Y and "Cell 3" transmits its system information in the subframe Z. The user plane cell specific system information includes, for example, service and/or slice specific configurations in the form of service/slice configuration data. As the system information of the control plane cell mainly or only contains scheduling information, the signalling overhead for the control plane cell is reduced in this embodiment. Moreover, as the service and slice specific information is broadcasted by each user plane cell individually, a single node failure problem might be avoided.

In a second approach, the layered system information is transmitted in a centralized manner, as shown in FIG. 4. In this embodiment, only the control plane cell transmits the system information including both the control plane cell specific system information including scheduling information and the user plane cell specific system information. However, the control plane cell transmits the user plane cell specific information "Cell 2 SI" and "Cell 3 SI" separated from the control plane specific system information "SI & Scheduling". The scheduling information indicates, for example, when the respective user plane cell specific system information is broadcasted.

The UE(s) in the respective user plane cell only needs to receive (process) the system information being specific for the respective user plane cell, whereby the access procedure of the UE to the user plane cell may be accelerated. Moreover, this approach saves resources of the user plane cell, as it does not have to broadcast its user plane cell specific system information.

In some embodiments, a virtual cell can be turned off, e.g. since there is no traffic demand in its area. But the base station (e.g. eNodeB) could broadcast virtual cell related system information instead, potentially with a longer period. If then a UE receives such system information and decides to access to the virtual cell, the UE functioning as a slave base station and establishing the virtual cell will indicate to the base station the demand to access this certain virtual cell. Upon receipt of this indication sent from the slave UE, the base station will activate the virtual cell and the UE can access to it after activation of the virtual cell. This procedure can also be applied to the turning off of small cells (virtual cells).

In some embodiments, the two approaches discussed above, are simultaneously implemented.

In some embodiments, for cells having the discussed turning on/off option or for the UE virtual cell, which is activated on demand, the frequency of the system information transmission can be adjusted according to its current activity. The transmission of the system information can even be deactivated or removed, for example, in cases where no activity in a corresponding cell is detected within a predefined time period. Such information will be indicated, for example, in the scheduling information which is broadcasted by the control plane cell, as discussed above.

In the following, embodiments pertaining to the system information transmission within one layer are discussed.

Within each layer, e.g. control plane layer, user plane layer, UE virtual cell, cell in different slices, as discussed above, the system information transmission can be improved as well in some embodiments. The current system information transmission of the current LTE is generally based on the periodicity of 40 ms (MIB), 80 ms (SIB1, SIB2-19), up to 5120 ms (SIB2-19). At present, in the current LTE a full set of "important" control information is included in the system information, without considering whether such information is necessary for all the UEs. In order to reduce the system information signalling and to release the UE burden to receive the system information, the following two approaches can be implemented in some embodiments.

In a first approach, the system information is separated or divided into static system information and semi-static system information.

For example, the control plane cell system information includes scheduling information, as discussed above, wherein the scheduling pattern of the user plane cell specific system information would keep unlikely changed and, thus, can be pre-configured as static system information, while the adopted scheduling pattern is likely to be adjusted, and, thus will be part of the semi-static system information. Furthermore, cell frequency configuration, bandwidth configuration, radio resource configuration (for which it is assumed that different parameter sets can be supported in future systems), numerology configurations (subcarrier spacing, CP length) will remain unchanged, and, thus, will be part of the static system information. But, the specific configuration to adopt will be adjusted, and, thus, will be part of the semi-static system information.

Additionally, in general, the configuration is cell specific (macro cell range for macro cell, small cell range for small cell, virtual cell range for virtual cell). But, with the user differentiation, the configuration may be user or user group specific. Thus, for example, for the UE virtual cell, there could be a list of pre-configured resource pools allocated by the base station, which could be treated as static system information, but, the specific usage of resource pools is decided by the virtual cell itself, and, thus, is treated as semi-static system information.

Then, in some embodiment, for the static system information, a relative longer transmission or broadcast period e.g. 5120 ms or even larger can be used, while for the semi-static system information a shorter transmission or broadcast period can be used, which might be even on the radio frame or subframe level. As in the semi-static system information only some indications will be included, as discussed above, the signalling amount could be reduced or could be even very small.

In a second approach, in some embodiments, a user differentiation to receive the system information is provided. A user (i.e. user equipment) may have different requirements for the system information. For example, the UEs in connected RRC state and a so-called limited RRC state, where only a part of the functionalities/configurations in conventional RRC state—is performed by the UE, may have different configurations. For instance, at least a UE in the limited RRC connection state does not need the radio resource configuration for the data transmission. However, the current LTE system does not support the UE differentiation in system information transmission and reception (single system information Radio Network Temporary Identity (SI-RNTI) for all UEs).

Some specific SI-RNTI (or different resources), different CRC (Cycled Redundancy Check) masks or data tags for different groups of UEs could be pre-defined. Then, when the UE enters into a certain group, the UE could start to receive different sets of system information. From the cell side, in this case it needs to send different sets of system information according to different groups as well. The grouping criteria could be based on services as well, e.g. eMBB, mCIoT (massive Cellular Internet of Things), etc. As the known non-orthogonal transmission technology is introduced in some embodiments, it is possible to transmit the system information of different user groups on the same resources by using the non-orthogonal transmission technology.

In the following two exemplary embodiments are described which use the two approaches discussed above and which realize the user differentiation in service regarding the system information.

In a first exemplary embodiment, the broadcasted system information includes information about the provided services, e.g. that the cell will support eMBB or massive MTC (Machine Type Communication) or both or the like. Based on this information, the UE, receiving the system information, decides whether there is a need to access the cell before sending the service request. This solution is especially useful for the layered system information, discussed above, that is, from the control plane cell system information (the control plane will broadcast slice information of each user plane cell), the UE knows whether the user plane cell and which user plane cell will provide the demanded service, even before the UE accesses that respective user plane cell providing the demanded service.

In a second exemplary embodiment, it is assumed that a cell has the knowledge about what kinds of services are and/or will be expected or demanded on the UE side. This is realized in some embodiments, by performing a user behaviour prediction on the basis of historical data, and/or the UE will send a respective service request to the cell. Then the cell will send/adjust the related service specific system information accordingly. For this system information transmission, the cell will broadcast the respective system information to all UEs, if all the UEs in the cell demand for a specific service, groupcasts the system information, e.g. to a group of UEs demanding the specific service, or provides a dedicated RRC signalling for a specific UE or small number UEs, especially in cases where special configurations for these UEs are available. The transmission resources could be multiplexed with system information for other UEs with the methods explained above. With this method, the system information could be sent on-demand, and, thus, an always on system information transmission may be avoided.

In some embodiments, with the proposed static system information and semi-static system information separation, only the necessary control information will be included in the system information and for the likely changed system information, its periodicity is very short. In some embodiments, the specific resources to be transmitted with the system information are pre-defined, and, thus, there is no special action needed to send or receive any change notification.

Figure 5:
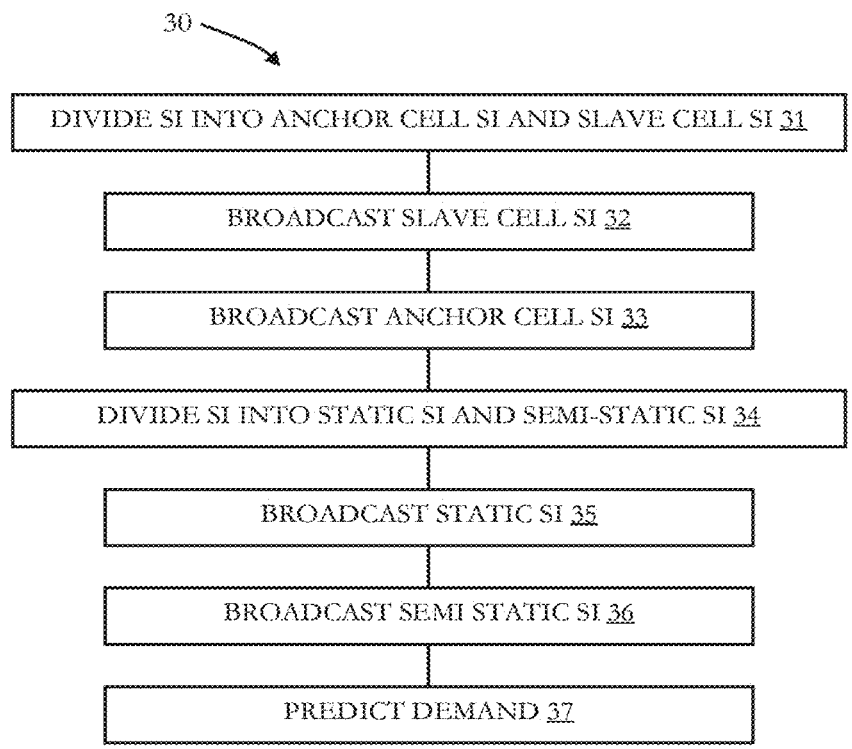
FIG. 5 shows a method to be performed by a base station or virtual cell.

In the following, a method 30 is explained under reference of FIG. 5, which can be performed by an anchor base station, e.g. base station 3(') of FIGS. 1 and 2, by a slave base station, such as UEs 5a('), 6a('), 7a(') of FIGS. 1 and 2 or a virtual cell, such as virtual cell 7(') of FIGS. 1 and 2, described herein. The various contents of the system information (anchor cell/control plane cell specific and slave cell/user plane cell specific) are not repeated and it is fully referred to the description above in that regard.

At 31, the system information ("SI") is divided into anchor cell specific information (e.g. control plane cell specific information) and slave cell specific information (e.g. user plane cell specific information), as discussed above.

At 32 the slave cell system information and at 33 the anchor cell system information are broadcasted, as discussed above.

At 34, the system information is divided into static system information and semi-static system information, as discussed above.

The static system information is broadcasted at 35 with a first periodicity and the semi-static system information is broadcasted at 36 with a second periodicity, wherein the first periodicity is larger than the second periodicity, as discussed above.

At 37, as discussed above, a user equipment demand is predicted on the basis of historical data.

The order of features 31-37 may be different in different embodiments and can be freely chosen. Moreover, other embodiments of the method only include a part of the features 31-37.

In the following, a method 40 is explained under reference of FIG. 6, which can be performed by a user equipment receiving system information from an anchor base station (anchor cell) and/or slave base station (slave cell), such as UEs 5b,c, 5b', 6b, c, 6b', 7b, 7b', 8a and 8b of FIGS. 1 and 2. The various contents of the system information (anchor cell/control plane cell specific and slave cell/user plane cell specific) are not repeated and it is fully referred to the description above in that regard.

At 41, anchor cell system information ("SI") and slave cell system information are received, as discussed above. As discussed, the system information may be divided into static system information and semi-static system information.

At 42, service related information is read from the anchor cell system information and/or the slave cell system information, and, as discussed above, on the basis of the service related information the user equipment may decide whether to access a specific cell or not.

At 43, scheduling information is read from the anchor cell system information and/or the slave cell system information, as discussed above.

At 44, a request to receive system information, e.g. virtual cell specific system information, as discussed above, is sent.

At 45, user equipment data is sent for pre-configuration, as discussed above.

Some embodiments focus on system information transmission/reception in the future 5G communication system. With the proposed scheme, the signalling overhead to transmit system information is reduced in some embodiment and the system information transmission/reception efficiency is improved, as is also explicated in the following.

As also discussed above, the UE access to a cell, which is in accordance with the UE's service requirement, may be accelerated. In conventional access procedure, the UE will not have any information about the provided services in the cell. Only after accessing the cell and having sent a service request, the UE would know whether the service requirement will be satisfied or not. In 5G, and, thus, in some embodiments, some cells, as discussed above, will be deployed/activated only for certain services. With the solution described herein, service related information will be broadcasted within the system information. Then after reading such service related information, the UE could decide whether there is the need to access to this cell or not. Furthermore, with the layered system information as described herein, from the control plane cell specific system information (the control plane will broadcast slice/service information of each user plane cell, as discussed above), the UE could know whether the user plane cell and which user plane cell will provide the satisfied or required service, even before reading any system information of that specific user plane cell.

As discussed, the reduction of the signalling overhead of a cell may be realized by turning off the system information transmission in some cells, for example, if that cell is turned off/deactivated. For the turned off/deactivated cell, the system information will be sent with its anchor cell/control plane cell instead, but, e.g. with a longer period. For the system information in each layer, the information is divided into static and semi-static system information, which may be sent with different periodicities, as discussed above. The semi-static system information, which is sent with a shorter period contains only small amount of data. The static system information, which occupies more resources will be sent with a longer period. Moreover, the above discussed user differentiation for realizing an on demand system information transmission instead of always on system information reduces the number of transmissions. After detecting and/or predicting the service requirement of a UE, the cell will broadcast (if all the UEs in the cell demand for a specific services), groupcast (for a group of UEs) or provide with dedicated RRC signalling (for one UE or a small number of UEs, especially in cases where special configurations for these UEs exist) respective information to the UEs, as discussed above.

Second Part—Connection Oriented and Connection-Less Communication for a Virtual Cell In the following, the second part of the present disclosure pertaining to connection oriented and connection-less communication for a virtual cell, such as a virtual cell as discussed above, is discussed. The following embodiments of this part may be implemented in combination with the embodiments of the first part, as described above, and/or the embodiments may be implement for themselves.

Moreover, the mobile telecommunications system with its components, anchor (control plane) base station, slave (user plane) base station, virtual cell, user equipment, etc., has already been discussed above (see also FIGS. 1 and 2 with associated description, where a RAN 1 and RAN 1' has been discussed). Of course, the disclosure of the first part fully applies to the second part.

In current LTE systems, such as discussed above, the connection oriented protocol is adopted in the radio interface, e.g. the radio bearer will be established between the UE and the base station, i.e. eNodeB.

Such establishment in current LTE systems might not only increase the signalling overhead, but could also impose extra setup time to transmit data. For the next generation cellular system, such as 5G, it is discussed to introduce network slicing, as discussed above, according to which the network can provide a variety type of services, for example, with different Quality of Service ("QoS") dynamically. In this sense, some treatment on radio access technology might be necessary in some embodiments. The introduction of the so-called connection-less communication can be used in future communication systems, which could be treated as a complementary scheme of connection oriented communication.

In some embodiments, the following issues are addressed (at least partially).

(1) The combination of connection oriented and connection-less communication as a whole.

(2) Improvement of QoS in connection-less communication.

(3) Differentiation of various QoS requirements in different schemes.

(4) Addressing the mobility issue of both the virtual cell and the UE in different schemes.

By considering the above challenges, the connection oriented and connection-less communication for a virtual cell is implemented in some of the embodiments described in the following.

In order to cater for different service QoS requirements, on the access link of UE and a virtual cell, such as virtual cell 7 and 7' of FIGS. 1 and 2 above, a combined connection oriented and connection-less communication is implemented in the following embodiments. Services requiring a frequent transmission and/or a QoS guarantee may adopt the connection oriented communication. On the other hand, services requiring infrequent transmission and/or low QoS guarantee will adopt the connection-less communication.

Some embodiments pertain the procedure or method for mobile originating ("MO") and mobile termination ("MT") data of connection-less communication, with considering the generally known grant based and grant free access scheme. In order to keep a service continuity when the UE and/or the virtual cell are moving, a UE context transfer is introduced in some embodiments by considering different handover scenarios.

In general, the deployment/activation of a virtual cell would follow various scenarios, as also has been described above, for example, activating a virtual cell in a hotspot area to enhance live video services which requires a high throughput and a QoS guarantee, or activating a virtual cell to support wearable devices which requires transmission of small/large data packets with less frequency.

Typical services that may be handled by a virtual cell in some embodiments are, as also indicated above:

(1) Frequent transmission as well as high QoS requirements, potentially with high data volume.
(2) Infrequent transmission and with low QoS requirements, and potentially with low/medium data volume.

Some embodiments focus on a link between the virtual cell and the UE, also referred to as virtual cell-UE link or, in brief, referred to as access link. Each (radio) bearer is associated with specific QoS parameters, hence the bearer play a role in the QoS control. The connection oriented communication is mainly referred to the radio bearer oriented communication, which means that there will be a radio bearer establishment/maintenance/release procedure on the access link in some embodiments. On the other hand, the connection-less communication is referred to as (radio) bearer less, since in this case there will be no (data) radio bearer on the access link.

As stated above, in order to support diverse services on an access link, both of the connection oriented and connection-less communication will be adopted.

In summary, the general principle in some embodiments is, as also indicated above:

(1) Services requiring frequent transmission and/or a QoS guarantee will adopt the connection oriented communication.
(2) On the other hand, services requiring infrequent transmission and/or a low QoS guarantee will adopt the connection-less communication.

In some embodiments, different message schemes are adopted for sending small/big infrequent data in the connection-less (communication) mode.

The connection-less concept has been proposed in TR23.720 of 3GPP, "Technical Specification Group Services and System Aspects; Architecture enhancements for Cellular Internet of Things", see, for example, Release 13.

Figure 6:
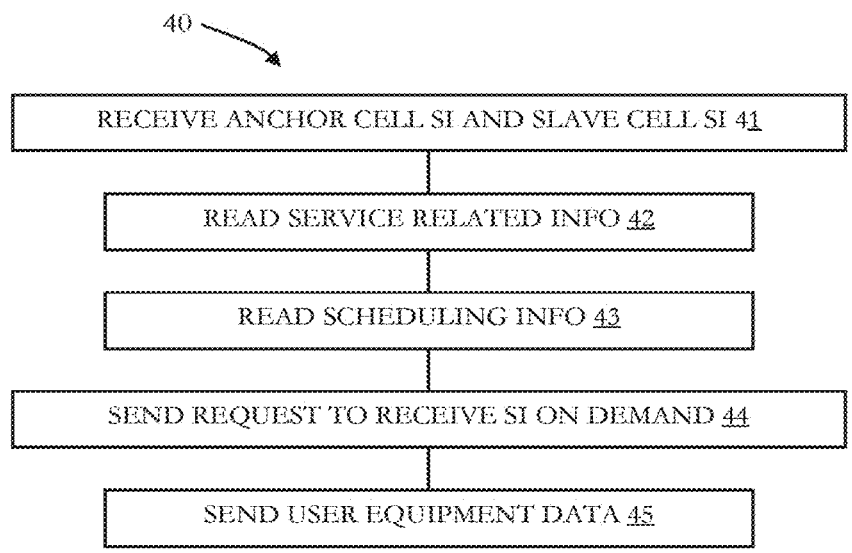
FIG. 6 shows a method to be performed by a user equipment.

With the scheme for connection-less communication as proposed in TR23.720, in particular, FIG. 6.3.1.2-1, the UE will immediately go back to the IDLE state after having sent the data on RACH signalling (Random Access CHannel). This is different to the conventional procedure that the UE will enter into the so-called RRC_CONNECTED (Radio Resource Control) state after a successful RACH and RRC connection establishment.

In TR23.270 the combination of connection oriented and connection-less communication for data transmission as well as its impact to the state transition is not considered, nor is a detailed RACH message elaborated, and, additionally, a grant free RACH scheme is not considered.

Figure 7:
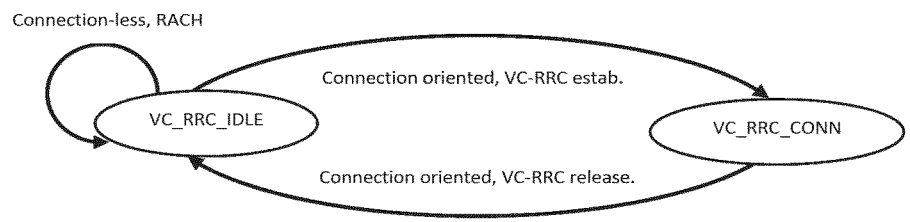
FIG. 7 shows a transition scheme for a user equipment in a connection-less and connection-oriented communication.

The situation as it results from the combination of connection-less and connection-oriented communication and the resulting respective UE state transitions in some embodiments are illustrated in FIG. 7.

On the left side of FIG. 7 it is assumed that the UE is in a so-called VC-RRC_IDLE state, i.e. the UE is a virtual cell ("VC") and waits for performing an RRC connection establishment.

The UE recognizes, when it has transmit data and decides, for example, based on the application layer which is used by a respective service demanding data transmission, which type of procedure it should perform.

If the UE determines that the data transmission is of a type falling under the frequent transmission and/or QoS guarantee data transmission, the UE will initiate the RRC connection establishment procedure (arrow "connection oriented, VC-RRC estab. In FIG. 7), e.g. RACH with RRC connection request message in message 3, and then transits to a VC_RRC_CONNECTED state, as it is typical for the connection-oriented communication. In the case that the UE is in the VC_RRC_CONNECTED state, it will transmit the data directly with the established bearers.

If the UE determines that the data transmission is of a type falling under the infrequent transmission and/or low QoS guarantee data transmission, the UE will initiate RACH procedure to send the data without VC RRC connection establishment procedure, for example of the procedure as in FIG. 6.3.1.2-1 of TR23.720, and, after having sent the data successfully, it will go back to VC_RRC_IDLE state, which is indicated by the respective loop on the left side of FIG. 7.

Before a more detailed description of these and other embodiments, some general statements about the embodiments are made.

Some embodiments, pertain to a base station for a mobile telecommunications system (LTE or the like, 5G, as discussed above), as also discussed above (also in the first part). The base station includes a circuitry which is configured to communicate with at least one user equipment of the mobile telecommunications system and at least one virtual cell of the mobile telecommunications system. The circuitry is further configured to record a mapping information of a mapping information between a user equipment and an evolved packet core entity of the mobile telecommunications system.

As already has been mentioned above, although herein and in the following features are described which are to be performed by a circuitry, the same features can be part of a method, which can be performed, for example, by a circuitry, such as the circuitry of the base station, the circuitry of a virtual cell (see description further below), and/or the circuitry of a user equipment (see further below).

The circuitry may be configured to send the mapping information to a virtual cell. It may be configured to receive context information of a user equipment falling back from a virtual cell to the base station, wherein the context information includes at least one of dedicated radio bearer configuration, signaling radio bearer configuration, user equipment identity, random access channel message preamble, and random access channel resource information. The circuitry may be configured to resume an on-going communication of the user equipment, e.g. when the user equipment leaves the current virtual cell and/or the current base station. The circuitry may be further configured to send data of the on-going communication through a radio bearer or directly to the target core network of the mobile telecommunications system, in dependence on a received indication, which indicates whether the user equipment is in a connection-less or connection-oriented communication.

Some embodiments pertain to a virtual cell, such as described herein, which is connectable to a base station of a mobile telecommunications system. The base station is configured to communicate with at least one user equipment and at least one virtual cell. The virtual cell includes circuitry which is configured to communicate with at least one user equipment and the base station and/or with at least one further virtual cell. The circuitry is further configured to record a mapping information of a mapping between a user equipment and an evolved packet core entity of the mobile telecommunications system. The circuitry may be configured to receive the mapping information from the base station. The circuitry may be configured to receive from a user equipment context information including at least one of: dedicated preamble, selected preamble, random access resources from dedicated preamble pool, random access resource pool. The circuitry may be configured to receive data directly from a user equipment according to a grant free random access procedure and to transmit a positive or negative acknowledgement. The circuitry may be configured to send data through a radio bearer or to send data directly to the target core network of the mobile telecommunications system in dependence on a received indication, which indicates whether the user equipment is in a connection-less or connection-oriented communication. The circuitry may be configured to forward data received from the user equipment to the core network of the mobile telecommunications system according to the mapping information. The circuitry may be configured to send data to a user equipment, which are encapsulated in a paging message. The circuitry may be configured to send context information of an on-going communication of a user equipment to a target virtual cell or target base station, wherein the context information includes at least one of: dedicated radio bearer configuration, signaling radio bearer configuration, user equipment identity, random access channel message preamble, and random access channel resource information.

Some embodiments pertain to a user equipment being connectable to a base station and a virtual cell of a mobile telecommunications system. The base station is configured to communicate with at least one user equipment and at least one virtual cell. The virtual cell is configured to communication with at least one user equipment and the base station. The user equipment includes a circuitry which is configured to transmit a user equipment virtual cell connection mode on the basis of data characteristics of data to be transmitted, which may indicate whether the data is to be transmitted on the basis of a connection-less communication or connection-oriented communication. The circuitry may be configured to transmit in a connection-less communication context information including at least one of: dedicated preamble, select preamble, random access resources from dedicated preamble pool, random access resource pool. The circuitry may be configured to transmit data directly to a virtual cell on the basis of a grant free random access procedure in a connection-less communication and to receive positive or negative acknowledgement. The circuitry may be configured to receive data in a paging message. The circuitry may be configured to initiate a radio resource control connection establishment procedure and then transit to a connected state, based on specific data characteristics of the data to be transmitted, wherein the data characteristics may be indicative of at least one of frequent transmission and high (first) quality of service guarantee. The circuitry may be configured to initiate a random access channel procedure for sending the data without a performing a virtual cell radio resource control connection establishment procedure, based on specific data characteristics of the data to be transmitted, wherein the data characteristics may be indicative of at least one of infrequent transmission and low (second) quality of service guarantee. Second quality of service guarantee may be lower than the first quality of service guarantee. The circuitry may be configured to go back to an idle state upon completion of the data transmission. The circuitry may be configured to transmit the data directly with established bearers in the case that the user equipment is in a virtual cell radio resource control connected state.

In the following, several embodiments will be discussed in more detail, for implementing the UE transitions as shown in FIG. 7 and as discussed above.

The following section starts with embodiments pertaining to the mobile origination data.

MO (mobile originating) data

At first, the case is discussed that the UE sends data on the RACH signalling when accessing to a virtual cell.

In the following, the conventional RACH procedure is considered under reference to FIG. 8.

Figure 8:
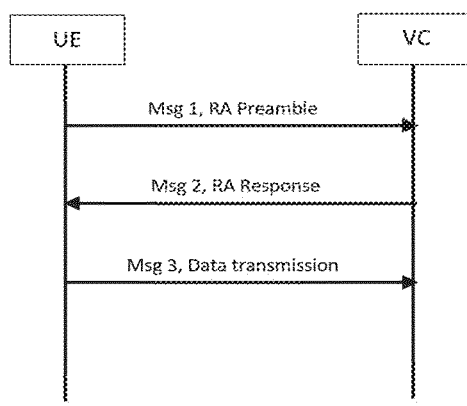
FIG. 8 shows a messaging scheme for a grant based RACH procedure in a connection-less communication.

FIG. 8 illustrates messages which are sent during the RACH procedure between the UE (left side) and the VC (virtual cell, right side), namely first message Msg 1 from the UE to the VC, a second message Msg 2, from the VC to the UE and a third message Msg 3, from the UE to the VC including the data transmission.

At first, the Msg 1 from the UE to the VC is discussed.

The UE, which wants to send data to the network and which is in the VC_RRC_IDLE state, will send in this embodiment, a first message Msg 1 to the VC, wherein the message Msg 1 includes a RA (Random Access) preamble. The UE sends a data transmission request in the Msg 1 of RACH to the VC which indicates that this is a connection-less communication.

The sending of the Msg 1 can be based in some embodiments on a contention less scheme and in other embodiment it can be based on a contention base scheme.

In the contention less scheme, as the name implies, there is no contention between different UEs sending the respective Msg 1. For the resources on which the UE will send the request, the virtual cell will indicate the dedicated preamble and/or RACH resources in the form of, for example, a PRACH (Physical Random Access CHannel) configuration index and PRACH mask index (together with the indication that it is for connection-less RACH), in order to avoid the collisions between different requesting UEs.

In the contention based scheme, as an alternative, the virtual cell could reserve a set of PRACH resources for connection-less communication only in order to separate the PRACH resources for normal communications, or reserve a group of preambles instead. Virtual cell and/or the (anchor or control plane) base station, e.g. eNodeB, broadcasts reserved resource information in the system information or inform the UEs with dedicated signalling. All the UEs, which want to send the respective connection-less communication request will content with each other on these reserved resources. The reasons to have separate PRACH are in some embodiments, at first, to distinguish the separate PRACH from the normal RACH in the case that UE has simultaneous connection-less and connected oriented communication. A second reason is to reduce the collision with the normal RACH. In the request of Msg 1, each UE indicates its identity in some embodiments, e.g. includes its identity in the request message Msg 1, scrambles the message with its identity, includes a special message tag, or the like. In the request message Msg 1, the data packet size or QoS requirements may be included as well, in order for the network to decide whether the connection-less communication is proper or not.

In summary, in some embodiments, the Msg1 will contain the following: preamble and or PRACH resource, connection-less indication if any, UE identity (for contention resolution), data packet size and/or QoS requirements, etc.

At next the Msg 2 from the virtual cell to the UE (RA response) is discussed.

After the virtual cell has received the transmission request, it will send the grant to the UE (if any).

Also here, some embodiments pertain to the contention less scheme and the contention based scheme.

In embodiments employing the contention less scheme, the virtual cell will send a grant to the UE in the response message Msg 2 after having received the request message Msg 1 from the UE.

In embodiments employing the contention based scheme, in cases where the virtual cell detects the message Msg 1 sent on the reserved PRACH resources, it will determine that a connection-less communication request is present. The virtual cell will decode the received message Msg 1, and, if this is successful, it will send the response message Msg 2 with an allocated grant and including the UE identity contained in the message Msg 1. If the virtual cell cannot decode the received message, it determines that some collisions happened. It will not send any message back.

In summary, in some embodiments, the message Msg 2 may include: allocated grant, UE identity, time advance, backoff indicator (if any), etc.

In the following, the message Msg 3 from the UE to the virtual cell including the data transmission will be explained.

Generally, the UE will send the data packets on the allocated grant channel.

In the contention less based embodiments, the UE will just send the data packet on the allocated grant channel without further procedural steps.

In the contention based embodiments, if the UE receives the grant and the UE identity in the message Msg 2, it will match it with its own identity, and, if they are identical, the UE will send the data packets on the allocated grant channel. Otherwise, i.e. the UE identity does not match to the received UE identity or the UE receives nothing within a pre-defined time window, the UE determines that there is collision. The UE may wait for a time period (e.g. with random backoff time), and starts the procedure with Msg 1 again.

In the following, embodiments are described which use a grant free RACH procedure.

In 5G, with the introduction of a non-orthogonal multiple access scheme, the request-grant procedure may not be necessary. In that case, the whole procedure will be simplified, as will be explained under reference of FIG. 9 in the following.

Figure 9:
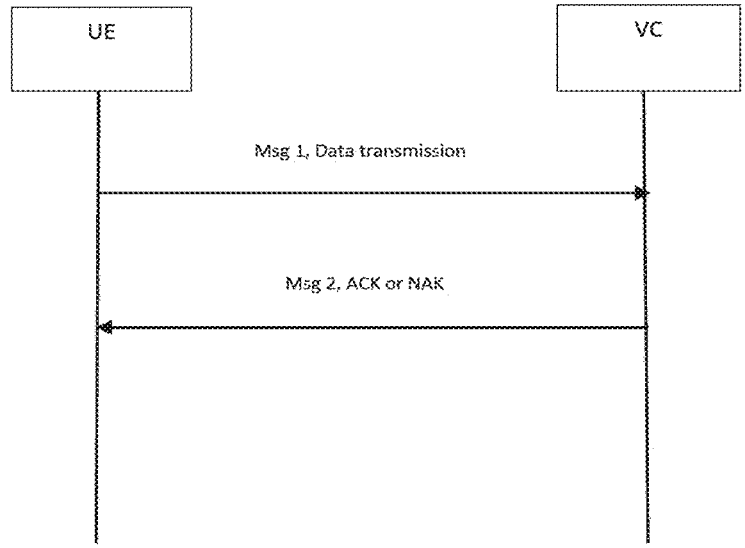
FIG. 9 shows a messaging scheme for a grant free RACH procedure in a connection-less communication.

FIG. 9 illustrates the messaging between the UE and the VC, wherein a first message Msg 1 including the data transmission is sent from the UE to the VC and a second message Msg 2 is sent from the VC to the UE including an acknowledgment ("ACK") or a negative acknowledgment ("NAK").

In the following the first message Msg 1 form the UE to the virtual cell including the data transmission is explained.

The UE will send data directly on, e.g. PRACH resources or a data channel. The virtual cell allocates a resource pool which is reserved only for the connection-less communication, or it indicates that this is a connection-less communication. The UE includes its UE identity in the Msg 1 for the following ACK/NAK message.

In the following the second message Msg 2 from the virtual cell to the UE including ACK/NAK is explained.

After the data is received in the Msg 1 message, an ACK or NAK will be sent from the virtual cell to the UE in the second message Msg 2. Before that, the virtual cell will notify the UE where it can receive the acknowledge message Msg 2 in the control channel.

The ACK/NAK message Msg 2 could be dedicated to each UE or it could be groupcasted (with all the UE identities to be acknowledged) to all the simultaneous transmissions from the UEs.

In the following, embodiments are discussed, wherein the UE sends data on the data channel after having sent a scheduling request.

For the UEs in the discussed VC_RRC_CONNECTED state and for the grant based transmission, the UE will first send a scheduling request to a virtual cell and indicate that this is a connection-less communication request. This may be followed by a packet size and/or QoS requirement and/or service pattern (periodical, instantaneous) information. With this information, the virtual cell will send an UL (-Uplink) grant (including SPS (Semi Persistent Scheduling) grant if necessary) to the UE in accordance with the request. With receipt of the grant, the UE will send the data packets directly to the virtual cell.

The UE identity is not only used for the contention resolution discussed above, but the UE identity is also used in some embodiment to indicate to the core network the entity destination of the data packets e.g. SGW (Serving Gateway of the Evolved Packet Core (EPC), PGW (PDN (Packet Data Network) Gateway of the EPC).

Moreover, in some embodiments, a mapping procedure is performed by the virtual cell or by the base station before the connection-less communication is performed.

For example, in some embodiments, the serving (anchor) base station (e.g. eNodeB) will have the EPS (Evolved Packet System) bearer information, which indicates the mapping information of the mapping between the UE and the EPC entity. Before the UE establishes the connection with the virtual cell, the base station will indicate such mapping information to the virtual cell.

Alternatively, in some embodiments, the virtual cell (or the base station) will establish the EPS bearer with the UE e.g. in the case of local break out. The mapping information of the mapping between the UE with the EPC entity will be recorded. The virtual cell may backup such information to the serving base station (eNodeB), if necessary.

In the following, embodiments pertaining to mobile terminating data are discussed.

MT (mobile terminating) data

For the MT data, a paging message will be used to transmit the data to UE being in the VC_RRC_IDLE state.

In some embodiments the core network of the mobile telecommunications system will find the respective base station (eNodeB) where the respective UE is located with a track area update of the respective virtual cell.

The track area update is described in a parallel European Patent Application 15200878.5, the entire content being incorporated herein by reference.

In brief, the paging and track area update uses a virtual cell tracking area (VCTA), the VCTA being a tracking area based on a virtual cell range, wherein a base station (e.g. eNodeB) has allocated the respective virtual cell for the respective UE. It can be provided a mapping rule, according to which each UE will have only one VCTA code, and each VCTA code will have only one base station (eNodeB) identity ID. The MME (Mobile Management Entity) can find the UE by sending a paging message to the eNodeB which is associated with the UE to be found. The paging message will be transmitted form the eNodeB to the virtual cell via RRC signalling. Then, the virtual cell sends the paging message to the UE on a paging channel and the UE receiving this paging message will initiate the above discussed VC RRC connection establishment accordingly. Finally, the successful paging indication will be sent to the MME.

Figure 10:
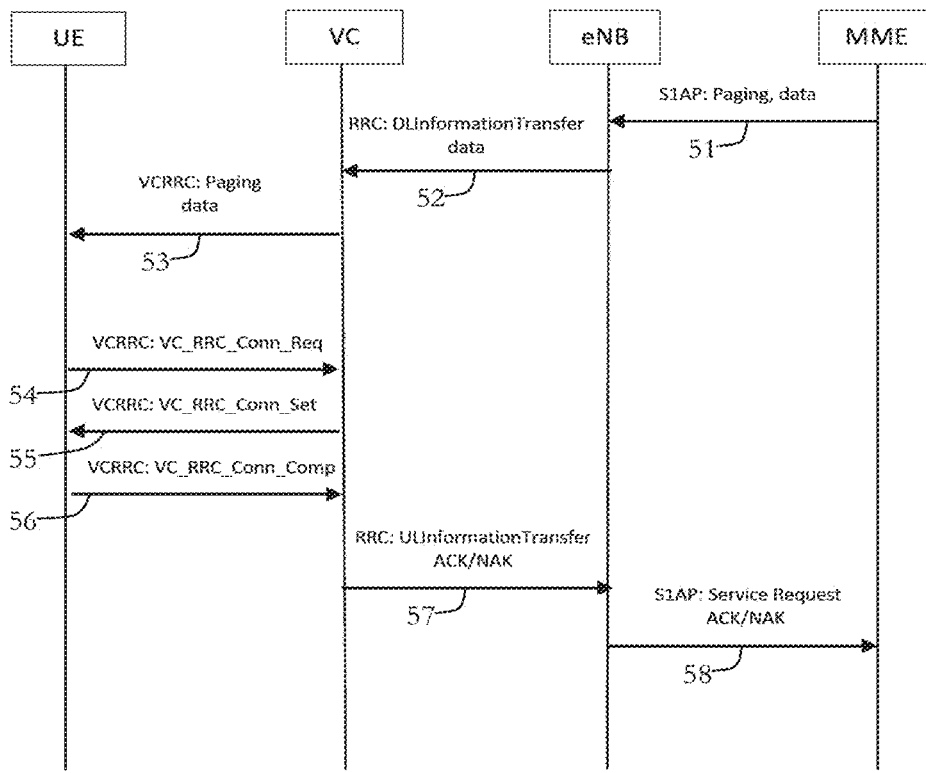
FIG. 10 shows a messaging scheme for a connection-less communication by paging.

After having found the respective UE, a messaging procedure, as also depicted in FIG. 10, will be performed.

At 51 the core network, i.e. the MME, sends a paging message S1AP to the base station eNB together with the data for the UE.

At 52, the eNB will transfer the paging message to the virtual cell VC with a RRC message including downlink information (DLInformationTransfer) and the data for the UE.

At 53, the virtual cell transmits the data together with the paging message VC_RRC to the UE.

At 54, the UE reacts with a VC_RRC message to the VC including a request ("VC_RRC_Conn_Req") for establishing the connection.

The VC reacts at 55, with a VC_RRC message including setup configuration of the connection ("VC_RRC_Conn_Set").

At 56, after the data transmission is finished, the UE sends a further VC_RRC message including an indication ("VC_RRC_Conn_Comp) that the RRC connection is completed.

The VC sends a respective ACK/NAK at 57 in an RRC message (including the indication "ULInformationTransfer" for the uplink), and the eNB sends at 58 a respective S1AP message including ACK/NAK to the core network (MME).

All messages including (useful) data for the UE, i.e. messages 51-53, also have an indication of the connection-less communication.

As an alternative, the step 54-56 can be omitted.

In the following, context transfer of the UE will be discussed.

Both, the UE and the virtual cell may move, hence an UE context transfer is provided in some embodiments, in order to keep the service continuity for both the connection oriented and connection-less communication. Depending on the handover scenarios, the UE context transfer may differ, as discussed in the following.

At first, a handover between virtual cells is discussed.

For the on-going connection oriented communication, the source virtual cell will transfer the corresponding dedicated radio bearer (DRB) and/or signalling radio bearer (SRB) related configurations to a target virtual cell, wherein this information is included in a respective context information. With this context information, the corresponding DRB and/or SRB will be re-configured on the access link between the target virtual cell and the UE.

For the on-going connection-less communication, the corresponding adopted RA preambles and/or RACH/DATA resources together with the UE identity will be transferred in a respective context information from the source virtual cell to the target virtual cell. With this context information, the mapping info of the UE identity and the EPC entity will be transferred as well, and the connection-less communication could be resumed on the new virtual cell.

At next, a fallback from the virtual cell to the base station (e.g. eNodeB) is discussed.

If the UE moves out of the coverage of the virtual cell because of its mobility or virtual cell's mobility, the UE will fallback to the base station.

In some embodiments, two situations are differentiated in the fall back scenario, namely the case that there is no limited RRC connection present between the UE and the base station and the case that there is a limited RRC connection present between the UE and the base station.

At first, the case that there is no limited RRC connection present between the UE and the base station is discussed.

For the on-going connection oriented communication, the source virtual cell will transfer context information including the corresponding DRB and/or SRB related configurations to the target base station. With this context information, the corresponding DRB and/or SRB will be re-configured on the access link between the target base station and the UE.

For the on-going connection-less communication, the corresponding adopted preambles and/or RACH/DATA resources together with the UE identity will be transferred included in a context information from the source virtual cell to target base station. With this context information, the connection-less communication could be resumed on the new (target) base station, wherein in some embodiments the base station supports connection-less communication.

At second, the case that there is a limited RRC connection present between the UE and the base station is discussed.

For the on-going connection oriented communication, the base station will resume the RRC connection between the UE and the base station including the suspended DRB/SRBs. Of course, the target base station could modify the DRB configurations by RRC connection reconfiguration.

For the on-going connection-less communication, the corresponding adopted preambles and/or RACH/DATA resources together with the UE identity will be transferred included in context information from the source virtual cell to the target base station. With this context information, the connection-less communication could be resumed on the new target base station, wherein in some embodiments the base station supports connection-less communication as well.

Figure 11:
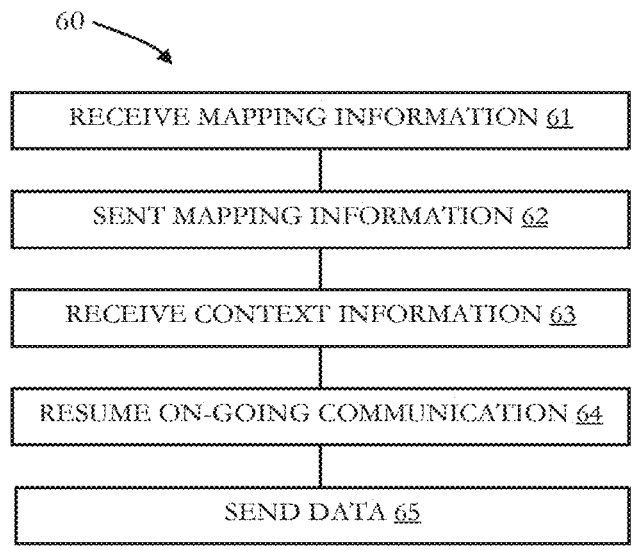
FIG. 11 shows a method to be performed by a base station.

FIG. 11 illustrates a flow chart of a method 60, which may be performed by a base station (or its circuitry) of the second part of the present disclosure, and which includes the features discussed above.

At 61, mapping information of a mapping between a user equipment and an evolved packet core entity of the mobile telecommunications system is recorded.

At 62, the mapping information is sent to a virtual cell, as discussed above.

At 63, context information of a user equipment falling back from a virtual cell to the base station is received, wherein the context information includes at least one of dedicated radio bearer configuration, signaling radio bearer configuration, user equipment identity, random access channel message preamble, and random access channel resource information.

At 64, an on-going communication of the user equipment is resumed, e.g. when the user equipment leaves the current virtual cell and/or the current base station, as discussed above.

At 65, data of the on-going communication are sent through a radio bearer or directly to the target core network of the mobile telecommunications system, in dependence on a received indication, which indicates whether the user equipment is in a connection-less or connection-oriented communication, as discussed above.

The order of features 61-65 may be different in different embodiments and can be freely chosen. Moreover, other embodiments of the method only include a part of the features 61-65.

Figure 12:
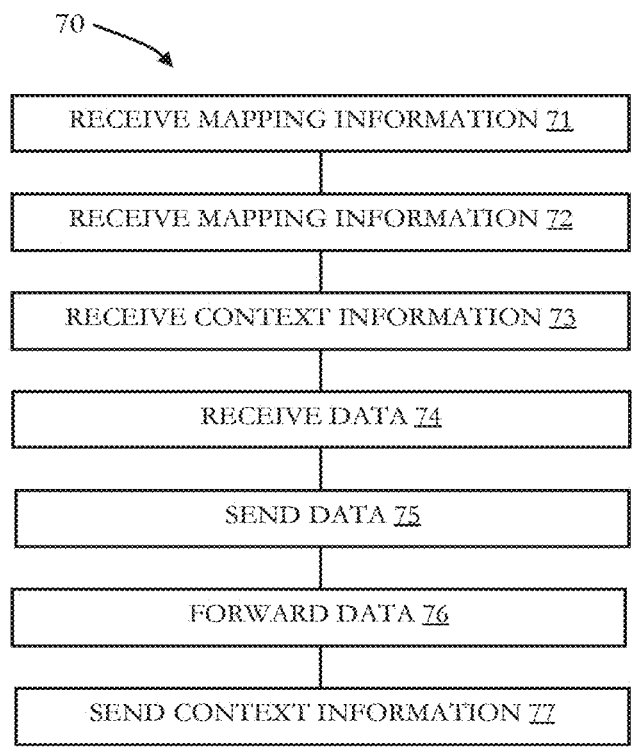
FIG. 12 shows a method to be performed by a virtual cell.

FIG. 12 illustrates a flow chart of a method 70, which can be performed by a virtual cell (or its circuitry), such as described herein.

At 71, mapping information of a mapping between a user equipment and an evolved packet core entity of the mobile telecommunications system is recorded, as discussed above.

At 72, the mapping information is received from the base station, as discussed above.

At 73, context information is received from a user equipment, wherein the context information including at least one of: dedicated preamble, selected preamble, random access resources from dedicated preamble pool, random access resource pool, as discussed above.

At 74, data are received directly from a user equipment according to a grant free random access procedure and a positive or negative acknowledgement can be transmitted, as discussed above.

At 75, data are sent through a radio bearer or data are sent directly to the target core network of the mobile telecommunications system in dependence on a received indication, which indicates whether the user equipment is in a connection-less or connection-oriented communication. The data sent to a user equipment can be encapsulated in a paging message, as discussed above.

At 76, data received from the user equipment are forwarded to the core network of the mobile telecommunications system according to the mapping information, as discussed above.

At 77, context information of an on-going communication of a user equipment is sent to a target virtual cell or target base station, wherein the context information includes at least one of: dedicated radio bearer configuration, signaling radio bearer configuration, user equipment identity, random access channel message preamble, and random access channel resource information, as discussed above.

The order of features 71-77 may be different in different embodiments and can be freely chosen. Moreover, other embodiments of the method only include a part of the features 71-77.

Figure 13:
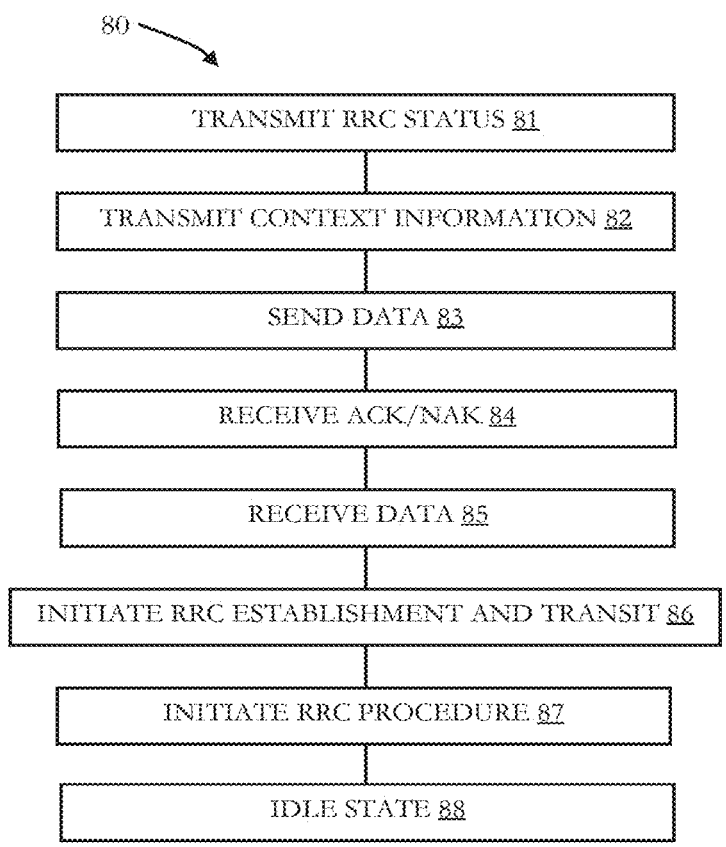
FIG. 13 shows a method to be performed by a user equipment.

FIG. 13 illustrates a flow chart of a method 80, which can be performed by a user equipment (or its circuitry), as described herein.

At 81, a user equipment virtual cell connection mode is transmitted on the basis of data characteristics of data to be transmitted. The connection mode indicates whether the data is to be transmitted on the basis of a connection-less communication or connection-oriented communication, as discussed above.

At 82, in a connection-less communication context information is transmitted, which includes at least one of: dedicated preamble, select preamble, random access resources from dedicated preamble pool, random access resource pool, as discussed above.

At 83, data are transmitted directly to a virtual cell on the basis of a grant free random access procedure in a connection-less communication, as discussed above. The data may also be transmitted directly with established bearers in the case that the user equipment is in a virtual cell radio resource control connected state (VC_RRC_CONNECTED).

At 84, a positive (ACK) or negative (NAK) acknowledgement is received, as discussed above.

At 85, data are received in a paging message, as discussed above.

At 86, a radio resource control connection (RRC) establishment procedure is initiated and then transit to a virtual cell RRC connected state (VC_RRC_CONNECTED), based on specific data characteristics of the data to be transmitted, wherein the data characteristics may be indicative of at least one of frequent transmission and high (first) quality of service guarantee, as discussed above.

At 87, a random access channel procedure is initiated, in order to send the data without a performing a virtual cell radio resource control connection establishment procedure, based on specific data characteristics of the data to be transmitted, wherein the data characteristics may be indicative of at least one of infrequent transmission and low (second) quality of service guarantee, as discussed above.

At 88, it is gone back to a virtual cell RRC idle state (VC_RRC_IDLE) upon completion of the data transmission.

The order of features 81-87 may be different in different embodiments and can be freely chosen. Moreover, other embodiments of the method only include a part of the features 81-87.

As discussed, some embodiments of the second part of the present disclosure focus on the combination of connection oriented and connection-less communication on the access link between a UE and a virtual cell. With the proposed schemes, the signalling overhead for data transmissions between the UE and the VC and vice versa may be reduced and the quality of service could be guaranteed in some embodiments.

Figure 14:
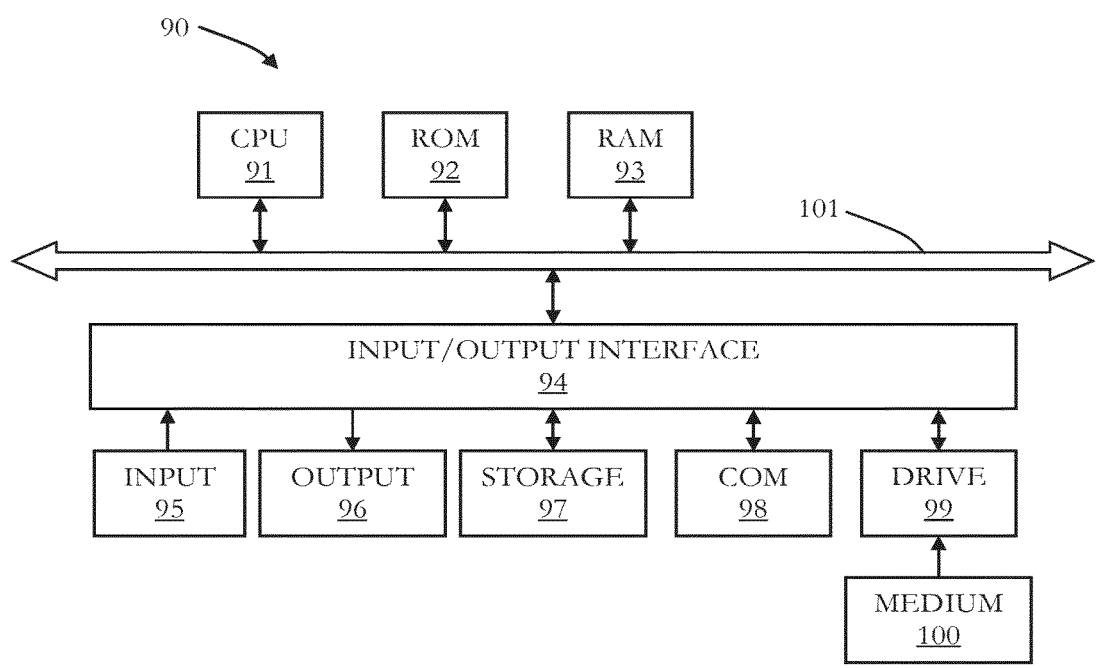
FIG. 14 shows a multi-purpose computer.

In the following, an embodiment of a general purpose computer 90 is described under reference of FIG. 14. The computer 90 can be such implemented that it can basically function as any type (anchor, slave, control plane, user plane, etc.) of base station, virtual/slave cell or user equipment as described herein. The computer has components 91 to 100, which can form a circuitry, such as anyone of the circuitries of the base station, virtual cell, slave cell, and user equipment, as described herein.

Embodiments which use software, firmware, programs or the like for performing the methods as described herein can be installed on computer 90, which is then configured to be suitable for the concrete embodiment.

The computer 90 has a CPU 91 (Central Processing Unit), which can execute various types of procedures and methods as described herein, for example, in accordance with programs stored in a read-only memory (ROM) 92, stored in a storage 97 and loaded into a random access memory (RAM) 93, stored on a medium 100 which can be inserted in a respective drive 99, etc.

The CPU 91, the ROM 92 and the RAM 93 are connected with a bus 101, which, in turn is connected to an input/output interface 94. The number of CPUs, memories and storages is only exemplary, and the skilled person will appreciate that the computer 90 can be adapted and configured accordingly for meeting specific requirements which arise, when it functions as a base station, virtual cell, and user equipment.

At the input/output interface 94 several components are connected: an input 95, an output 96, the storage 97, a communication interface 98 and the drive 99 into which a medium 100 (compact disc, digital video disc, compact flash memory, or the like) can be inserted.

The input 95 can be a pointer device (mouse, graphic table, or the like), a keyboard, a microphone, a camera, a touchscreen etc.

The output 96 can have a display (liquid crystal display, cathode ray tube display, light emittance diode display, etc.), loudspeakers, etc.

The storage 97 can have a hard disk, a solid state drive and the like.

The communication interface 98 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 90. Alternative configurations may be implemented with additional or other sensors, storage devices, interfaces or the like. For example, the communication interface 98 may support other radio access technologies than the mentioned UMTS and LTE.

When the computer 90 functions as a base station the communication interface 98 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). The present disclosure is not limited to any particularities of such protocols.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method features and an exemplary number of method features. The specific ordering of method features is however given for illustrative purposes only and should not be construed as binding. Such changes of the ordering of method features are be apparent to the skilled person.

In so far as the embodiments of the disclosure described above are implemented, at least in part, using software-controlled data processing apparatus, such as computer 90 above, it will be appreciated that a computer program providing such software control and a transmission, storage or other medium by which such a computer program is provided are envisaged as aspects of the present disclosure.

Note that the present technology can also be configured as described below.

(1) A mobile telecommunications system anchor base station for a mobile telecommunications system including at least one anchor cell and at least one slave cell being associated with the anchor cell, the anchor base station comprising circuitry being configured to:
broadcast slave cell system information being specific for the at least one slave cell.

(2) The mobile telecommunications system anchor base station of (1), wherein the circuitry is further configured to broadcast anchor cell system information being specific for the at least one anchor cell.

(3) The mobile telecommunications system anchor base station of (1) or (2), wherein the communication in the mobile telecommunications system is distributed at least over a control plane and a user plane, wherein signaling is communicated over the control plane and user data are communicated over the user plane, and wherein the circuitry is further configured to broadcast system information over the control plane and the user plane.

(4) The mobile telecommunications system anchor base station of (3), wherein the at least one anchor cell is a control plane cell and the at least one slave cell is a user plane cell.

(5) The mobile telecommunications system anchor base station of (3) or (4), wherein the circuitry is further configured to broadcast control plane specific system information.

(6) The mobile telecommunications system anchor base station of anyone of (3) to (5), wherein the circuitry is further configured to broadcast slave cell system information including user plane specific information.

(7) The mobile telecommunications system anchor base station of anyone of (3) to (6), wherein the slave cell system information includes scheduling information indicating a broadcast schedule for the user plane.

(8) The mobile telecommunications system anchor base station of (7), wherein the user plane specific information includes the scheduling information.

(9) The mobile telecommunications system anchor base station of anyone of (3) to (8), wherein the slave cell system information includes information indicating services supported by the user plane.

(10) The mobile telecommunications system anchor base station of (9), wherein the user plane specific information includes the information indication services supported by the user plane.

(11) The mobile telecommunications system anchor base station of anyone of the previous claims, wherein the circuitry is further configured to broadcast the slave cell system information with different periodicity.

(12) The mobile telecommunications system anchor base station of anyone of the previous claims, wherein the system information is divided into static system information and semi-static system information.

(13) The mobile telecommunications system anchor base station of (11), wherein the circuitry is further configured to broadcast the static system information with a first periodicity and the semistatic system information with a second periodicity, the first and second periodicity being different.

(14) The mobile telecommunications system anchor base station of (12) or (13), wherein the static system information includes at least one of cell specific configuration data which are unchangeable and cell specific candidate configuration data.

(15) The mobile telecommunications system anchor base station of anyone of (12) to (14), wherein the semi-static system information includes cell specific configuration data which are changeable.

(16) The mobile telecommunications system anchor base station of (14) or (15), wherein the semi-static system information includes adopted cell specific configuration data according to the candidate configuration data included in the static system information.

(17) The mobile telecommunications system anchor base station of anyone of the previous claims, wherein the circuitry is further configured to broadcast the slave cell system information in response to a received request issued by a user equipment.

(18) The mobile telecommunications system anchor base station of (17), wherein the circuitry is further configured to broadcast slave cell system information which is specific for the user equipment.

(19) The mobile telecommunications system anchor base station of (18), wherein the circuitry is further configured to broadcast the user specific slave cell system information on the basis of at least one of groupcast transmission or radio resource control signaling.

(20) The mobile telecommunications system anchor base station of anyone of (17) to (19), wherein the circuitry is further configured to predict a demand of the user equipment on the basis of historical data.

(21) The mobile telecommunications system anchor base station of anyone of the previous claims, wherein the circuitry is further configured to communicate with at least one user equipment and at least one slave cell base station.

(22) A mobile telecommunications system slave base station for a mobile telecommunications system including at least one anchor cell and at least one slave cell being associated with the anchor cell, the slave base station comprising circuitry being configured to:
broadcast slave cell specific system information being specific for the at least one slave cell.

(23) The mobile telecommunications system slave base station of (22), wherein the communication in the mobile telecommunications system is distributed at least over a control plane and a user plane, wherein signaling is communicated over the control plane and user data are communicated over the user plane, and wherein the circuitry is further configured to broadcast system information over the user plane.

(24) The mobile telecommunications system slave base station of (23), wherein the at least one anchor cell is a control plane cell and the at least one slave cell is a user plane cell.

(25) The mobile telecommunications system slave base station of (23) or (24), wherein the slave cell specific system information includes user plane specific system information.

(26) The mobile telecommunications system slave base station of (25), wherein the user plane specific system information includes numerology and waveform configuration data.

(27) The mobile telecommunications system slave base station of (25) or (26), wherein the user plane specific system information includes service related configuration data.

(28) The mobile telecommunications system slave base station of anyone of (25) to (27), wherein the circuitry is further configured to divide the system information into static system information and semi-static system information.

(29) The mobile telecommunications system slave base station of (28), wherein the circuitry is further configured to broadcast the static system information with a first periodicity and the semistatic system information with a second periodicity, the first and second periodicity being different.

(30) The mobile telecommunications system slave base station of (28) or (29), wherein the static system information includes at least one of cell specific configuration data which are unchangeable and cell specific candidate configuration data.

(31) The mobile telecommunications system slave base station of anyone of (28) to (30), wherein the semi-static system information includes cell specific configuration data which are changeable.

(32) The mobile telecommunications system slave base station of (30) or (31), wherein the semistatic system information includes adopted cell specific configuration data according to the candidate configuration data included in the static system information.

(33) The mobile telecommunications system slave base station of anyone of (22) to (32), wherein the circuitry is further configured to broadcast the slave cell system information in response to a received request issued by a user equipment.

(34) The mobile telecommunications system slave base station of (33), wherein the circuitry is further configured to broadcast slave cell system information which is specific for the user equipment.

(35) The mobile telecommunications system slave base station of (34), wherein the circuitry is further configured to broadcast the user specific slave cell system information on the basis of at least one of groupcast transmission or radio resource control signaling.

(36) The mobile telecommunications system slave base station of anyone of (33) to (35), wherein the circuitry is further configured to predict a demand of the user equipment on the basis of historical data.

(37) The mobile telecommunications system slave base station of anyone of (22) to (36), wherein the circuitry of is further configured to communicate with at least one user equipment and at least one anchor cell base station.

(38) A slave cell being established by a slave base station and being connected to an anchor base station in a mobile telecommunications system, the mobile telecommunications system comprising the anchor base station, the anchor base station being configured to communicate with at least one user equipment and at least one further slave cell, the at least one further slave cell being configured to communication with at least one user equipment and the anchor base station, the slave cell comprising circuitry being configured to:

broadcast slave cell specific system information being specific for the at least one slave cell.

(39) The slave cell of (38), wherein the communication in the mobile telecommunications system is distributed at least over a control plane and a user plane, wherein signaling is communicated over the control plane and user data are communicated over the user plane, and wherein the slave circuitry is further configured to broadcast system information over the user plane.

(40) The slave cell of (39), wherein the at least one anchor cell is a control plane cell and the at least one slave cell is a user plane cell.

(41) The slave cell of (39) or (40), wherein the slave cell specific system information includes user plane specific system information.

(42) The slave cell of (41), wherein the user plane specific system information includes supported services of the slave cell.

(43) The slave cell of (41) or (42), wherein the user plane specific system information includes slice information.

(44) The slave cell of anyone of (41) to (43), wherein the user plane specific system information includes numerology and waveform configuration data.

(45) The slave cell of anyone of (41) to (44), wherein the user plane specific system information includes timer configuration data.

(46) The slave cell of anyone of (41) to (45), wherein the user plane specific system information includes band information.

(47) The slave cell of anyone of (41) to (46), wherein the user plane specific system information includes mobile status information.

(48) The slave cell of anyone of (41) to (47), wherein the user plane specific system information includes resource pool configuration data.

(49) The slave cell of anyone of (41) to (48), wherein the circuitry is further configured to divide the system information into static system information and semi-static information.

(50) The slave cell of (49), wherein the circuitry is further configured to broadcast the static system information with a first periodicity and the semi-static system information with a second periodicity, the first and second periodicity being different.

(51) The slave cell of (49) or (50), wherein the static system information includes at least one of cell specific configuration data which are unchangeable and cell specific candidate configuration data.

(52) The slave cell of anyone of (49) to (51), wherein the semi-static system information includes cell specific configuration data which are changeable.

(53) The slave cell of (51) or (52), wherein the semi-static system information includes adopted cell specific configuration data according to the candidate configuration data included in the static system information.

(54) The slave cell of anyone of (38) to (53), wherein the circuitry is further configured to broadcast the slave cell system information in response to a received request issued by a user equipment.

(55) The slave cell of (54), wherein the circuitry is further configured to broadcast slave cell system information which is specific for the user equipment.

(56) The slave cell of (55), wherein the circuitry is further configured to broadcast the user specific slave cell system information on the basis of at least one of groupcast transmission or radio resource control signaling.

(57) The slave cell of anyone of (54) to (56), wherein the circuitry is further configured to predict a demand of the user equipment on the basis of historical data.

(58) The slave cell of anyone of (38) to (57), wherein the circuitry is further configured to communicate with another slave cell being established by another slave base station.

(59) A user equipment being connectable to at least one anchor cell and at least one slave cell of a mobile telecommunications system, the mobile telecommunications system comprising the anchor cell being configured to communicate with at least one user equipment and at least one slave cell, the at least one slave cell being established by a slave base station and being configured to communication with at least user equipment and the anchor base station, the user equipment comprising a circuitry being configured to:

receive system information from different physical cell sites.

(60) The user equipment of (59), wherein the different physical cell sites include at least one anchor cell and at least one slave cell.

(61) The user equipment of (59) or (60), wherein the circuitry is further configured to receive system information including information indicating at least one service provided by the at least one slave cell.

(62) The user equipment of (61), wherein the circuitry is further configured to read the service related information from the system information and to determine whether to access the slave cell based on the service related information.

(63) The user equipment of anyone of (59) to (62), wherein the circuitry is further configured to receive system information from the anchor cell and slave cell specific system information from the slave cell.

(64) The user equipment of (63), wherein at least one of the system information and the slave cell specific system information includes scheduling information.

(65) The user equipment of (64), wherein the circuitry is further configured to read the scheduling information from the anchor cell specific information and to receive the slave cell specific system information from the slave cell.

(66) The user equipment of anyone of (59) to (65), wherein the circuitry is further configured to send a request to receive system information on demand, wherein the system information includes user equipment specific system information.

(67) The user equipment of (66), wherein the circuitry is further configured to send the request to the anchor cell or the slave cell.

(68) The user equipment of anyone of (59) to (66), wherein the circuitry is further configured to receive system information which is divided into static system information and semi-static system information.

(69) The user equipment of anyone of (59) to (68), wherein the circuitry is further configured to send user equipment specific preference data to the anchor cell or to the slave cell for preconfiguration.

(70) A base station for a mobile telecommunications system, the base station comprising a circuitry being configured to communicate with at least one user equipment of the mobile telecommunications system and at least one virtual cell of the mobile telecommunications system, the circuitry being further configured to:
record a mapping information of a mapping between a user equipment and a evolved packet core entity of the mobile telecommunications system.

(71) The base station of (70), wherein the circuitry is further configured to send the mapping information to a virtual cell.

(72) The base station of (70) or (71), wherein the circuitry is further configured to receive context information of a user equipment falling back from a virtual cell to the base station.

(73) The base station of (72), wherein the context information includes at least one of dedicated radio bearer configuration, signaling radio bearer configuration, user equipment identity, random access channel message preamble, and random access channel resource information.

(74) The base station of anyone of (72) or (73), wherein the circuitry is further configured to resume an on-going communication of the user equipment.

(75) The base station of (70) to (74), wherein the circuitry is further configured to send data of the on-going communication through a radio bearer or directly to the target core network of the mobile telecommunications system, in dependence on a received indication, which indicates whether the user equipment is in a connection-less or connection-oriented communication.

(76) A virtual cell being connectable to a base station of a mobile telecommunications system, the base station being configured to communicate with at least one user equipment and at least one virtual cell, the virtual cell comprising circuitry being configured to communicate with at least one user equipment and the base station, the circuitry being further configured to:
record a mapping information of a mapping between a user equipment and a evolved packet core entity of the mobile telecommunications system.

(77) The virtual cell of (76), wherein the circuitry is further configured to receive the mapping information from the base station.

(78) The virtual cell of (76) or (77), wherein the circuitry is further configured to receive from a user equipment context information including at least one of: dedicated preamble, selected preamble, random access resources from dedicated preamble pool, random access resource pool.

(79) The virtual cell of anyone of (76) to (78), wherein the circuitry is further configured to receive data directly from a user equipment according to a grant free random access procedure and to transmit a positive or negative acknowledgement.

(80) The virtual cell of anyone of (76) to (79), wherein the circuitry is further configured to send data through a radio bearer or to send data directly to the target core network of the mobile telecommunications system in dependence on a received indication, which indicates whether the user equipment is in a connection-less or connection-oriented communication.

(81) The virtual cell of anyone of (76) to (80), wherein the circuitry is further configured to forward data received from the user equipment to the core network of the mobile telecommunications system according to the mapping information.

(82) The virtual cell of anyone of (76) to (81), wherein the circuitry is further configured to send data to a user equipment encapsulated in a paging message.

(83) The virtual cell of anyone of (76) to (82), wherein the circuitry is further configured to send context information of an on-going communication of a user equipment to a target virtual cell or target base station.

(84) The virtual cell of (83), wherein the context information includes at least one of: dedicated radio bearer configuration, signaling radio bearer configuration, user equipment identity, random access channel message preamble, and random access channel resource information.

(85) A user equipment being connectable to a base station and a virtual cell of a mobile telecommunications system, the base station being configured to communicate with at least one user equipment and at least one virtual cell, the virtual cell being configured to communication with at least one user equipment and the base station, the user equipment comprising a circuitry being configured to:
transmit a user equipment virtual cell connection mode on the basis of data characteristics of data to be transmitted.

(86) The user equipment of (85), wherein the user equipment virtual cell connection mode indicates whether the data is to be transmitted on the basis of a connection-less communication or connection-oriented communication.

(87) The user equipment of (85) or (86), wherein the circuitry is further configured to transmit in a connection-less communication context information including at least one of: dedicated preamble, select preamble, random access resources from dedicated preamble pool, random access resource pool.

(88) The user equipment of anyone of (85) to (87), wherein the circuitry is further configured to transmit data directly to a virtual cell on the basis of a grant free random access procedure in a connection-less communication and to receive positive or negative acknowledgement.

(89) The user equipment of anyone of (85) to (88), wherein the circuitry is further configured to receive data in a paging message.

(90) The user equipment of anyone of (85) to (89), wherein the circuitry is further configured to initiate a radio resource control connection establishment procedure and then transit to a connected state, based on specific data characteristics of the data to be transmitted.

(91) The user equipment of (90), wherein the data characteristics are indicative of at least one of frequent transmission and high quality of service guarantee.

(92) The user equipment of anyone of (85) to (91), wherein the circuitry is further configured to initiate a random access channel procedure for sending the data without a performing a virtual cell radio resource control connection establishment procedure, based on specific data characteristics of the data to be transmitted.

(93) The user equipment of (92), wherein the data characteristics are indicative of at least one of infrequent transmission and low quality of service guarantee.

(94) The user equipment of (92) or (93), wherein the circuitry is further configured to go back to an idle state upon completion of the data transmission.

(95) The user equipment of anyone of (85) to (94), wherein the circuitry is further configured to transmit the data directly with established bearers in the case that the user equipment is in a virtual cell radio resource control connected state.

The invention claimed is:

1. A mobile telecommunications system slave base station for a mobile telecommunications system including at least one anchor cell and at least one slave cell being associated with the at least one anchor cell, the slave base station comprising circuitry being configured to:
broadcast slave cell specific system information being specific for the at least one slave cell,
wherein the communication in the mobile telecommunications system is distributed at least over a control plane and a user plane,
wherein signaling is communicated over the control plane and user data are communicated over the user plane,
wherein the circuitry of the slave base station is further configured to broadcast system information over the user plane,
wherein the slave cell specific system information includes user plane specific system information, and
wherein the user plane specific system information includes numerology and waveform configuration data.

2. The mobile telecommunications system slave base station of claim 1, wherein the at least one anchor cell is a control plane cell and the at least one slave cell is a user plane cell.

3. The mobile telecommunications system slave base station of claim 1, wherein the user plane specific system information includes service related configuration data.

4. The mobile telecommunications system slave base station of claim 1, wherein the circuitry of the slave base station is further configured to divide the system information into static system information and semi-static system information.

5. The mobile telecommunications system slave base station of claim 4, wherein the circuitry of the slave base station is further configured to broadcast the static system information with a first periodicity and the semi-static system information with a second periodicity, the first and second periodicity being different.

6. The mobile telecommunications system slave base station of claim 4, wherein the static system information includes at least one of cell specific configuration data which are unchangeable and cell specific candidate configuration data.

7. The mobile telecommunications system slave base station of claim 4, wherein the semi-static system information includes cell specific configuration data which are changeable.

8. The mobile telecommunications system slave base station of claim 6, wherein the semi-static system information includes adopted cell specific configuration data according to the candidate configuration data included in the static system information.

9. The mobile telecommunications system slave base station of claim 1, wherein the circuitry of the slave base station is further configured to broadcast the slave cell system information in response to a received request issued by a user equipment.

10. The mobile telecommunications system slave base station of claim 9, wherein the circuitry of the slave base station is further configured to broadcast slave cell system information which is specific for the user equipment.

11. The mobile telecommunications system slave base station of claim 10, wherein the circuitry of the slave base station is further configured to broadcast the user specific slave cell system information based on at least one of groupcast transmission or radio resource control signaling.

12. The mobile telecommunications system slave base station of claim 9, wherein the circuitry of the slave base station is further configured to predict a demand of the user equipment based on historical data.

13. The mobile telecommunications system slave base station of claim 1, wherein the circuitry of the slave base station is further configured to communicate with at least one user equipment and at least one anchor cell base station.

14. The mobile telecommunications system slave base station of claim 1, wherein the user plane specific system information includes slice information, a timer configuration data indication regarding when and/or how long a virtual cell is turned on, band information, mobile status information, and/or resource pool configuration data.

15. A slave cell being established by a slave base station and being connected to an anchor base station in a mobile telecommunications system, the mobile telecommunications system comprising the anchor base station, the anchor base station being configured to communicate with at least one user equipment and at least one further slave cell, the at least one further slave cell being configured to communication with at least one user equipment and the anchor base station, the slave cell comprising circuitry configured to:
broadcast slave cell specific system information being specific for the at least one slave cell,
wherein the communication in the mobile telecommunications system is distributed at least over a control plane and a user plane,
wherein signaling is communicated over the control plane and user data are communicated over the user plane, wherein the circuitry of the slave cell is further configured to broadcast system information over the user plane, wherein the slave cell specific system information includes user plane specific system information, and wherein the user plane specific system information includes numerology and waveform configuration data.

16. The slave cell of claim 15, wherein the anchor base station includes at least one anchor cell, the at least one anchor cell being a control plane cell, and wherein the slave cell is a user plane cell.

17. The slave cell of claim 16, wherein the user plane specific system information includes the numerology and the waveform configuration data.

18. The slave cell of claim 15, wherein the user plane specific system information includes the numerology and the waveform configuration data.

19. The slave cell of claim 15, wherein the user plane specific system information includes slice information, a timer configuration data indication regarding when and/or how long a virtual cell is turned on, band information, mobile status information, and/or resource pool configuration data.

* * * * *